United States Patent

Tsurutani et al.

[11] Patent Number: 5,889,925
[45] Date of Patent: Mar. 30, 1999

[54] METHOD AND EQUIPMENT FOR ASSEMBLING COMPONENTS

[75] Inventors: Saburo Tsurutani; Yoshiharu Nishida; Akihira Nishikawa, all of Kobe, Japan

[73] Assignee: Kabushiki Kaisha Kobe Seiko Sho, Kobe, Japan

[21] Appl. No.: 864,078

[22] Filed: May 28, 1997

[30] Foreign Application Priority Data

May 29, 1996 [JP] Japan .................................. 8-159054

[51] Int. Cl.⁶ ................................................ G05B 19/18
[52] U.S. Cl. ............................. 395/89; 395/80; 395/85; 395/95; 364/468.01
[58] Field of Search .................. 364/468.01; 395/80, 395/85, 86, 88, 89, 95

[56] References Cited

U.S. PATENT DOCUMENTS

| | | | |
|---|---|---|---|
| 4,458,321 | 7/1984 | Whitney | 364/513 |
| 4,595,989 | 6/1986 | Yasukawa | 364/513 |
| 4,831,549 | 5/1989 | Red | 364/513 |
| 4,980,839 | 12/1990 | Souji | 364/513 |
| 5,021,970 | 6/1991 | Mohri | 364/513 |
| 5,105,368 | 4/1992 | Alexandersen | 395/89 |
| 5,161,101 | 11/1992 | Nishiyama | 364/191 |
| 5,189,351 | 2/1993 | Torii | 318/568.19 |
| 5,297,238 | 3/1994 | Wang | 395/94 |
| 5,345,540 | 9/1994 | Schleifer | 395/86 |
| 5,371,836 | 12/1994 | Mitomi | 395/80 |

*Primary Examiner*—Emanuel Todd Voeltz
*Assistant Examiner*—Richard H. Musgrove
*Attorney, Agent, or Firm*—Hazel & Thomas, P.C.

[57] ABSTRACT

According to the present invention there is provided a component assembling method capable of assembling a plurality of components in a successive manner, in which method faces of each component are contacted successively with two or more reference planes by using the known servo float function as a method for controlling each robot axis.

The component assembling method uses a reference table 4 having at least two planes which are a first reference plane 5 and a second reference plane 6 different in the direction of normal line from each other, and a robot system for grasping and moving each component to a given position on the reference table 4. The method in question includes at least a first step of pushing the component as grasped by the robot system against the first reference plane 5, changing the posture of the robot system to let the component lie along the first reference plane 5, and storing or fixing the said change in posture of the robot system, and a second step, subsequent to the first step, of pushing the component as grasped by the robot system against the second reference plane 6, changing the posture of the robot system to let the component lie along the second reference plane 6, and storing or fixing the said change in posture of the robot system.

9 Claims, 23 Drawing Sheets

COORDINATE SYSTEM

FIG. I

METHOD AND EQUIPMENT FOR ASSEMBLING COMPONENTS

BACKGROUND OF THE INVENTION

1. Field of the Invention

The present invention relates to a method and equipment for assembling a plurality of components using a robot. Particularly, the invention is concerned with a components assembling method and equipment wherein components are each pushed against two or more reference planes to correct the posture thereof.

2. Description of the Prior Art

The process of joining faces of components constituted by many faces to assemble the components into a product is often carried out by manual labor, and attempts have heretofore been made to automate the said process by the use of a robot. Also as to operations to be performed by the robot, there are required contents corresponding to six axes of freedom or more, and to meet this requirement there is now a tendency to use a robot having joints of six axes or so. Therefore, for assembling a plurality of components into a desired product with a predetermined certain accuracy, using a robot, it is necessary that the axes of the robot for determining the position and posture of the robot be moved with a predetermined certain accuracy.

According to a conventional method for assembling such components using a robot, the position to which the robot is to move is given to each axis of the robot by teaching, and the position thus taught is reproduced as a motion of the robot.

On the other hand, as components to be assembled using a robot there are not only machined components but also components for canning. It goes without saying that a high accuracy is required for assembling machined components. But in assembling components for canning, the cutting and bending accuracy for plates is not so strict as the machining accuracy, so in order to obtain a weld assembly of a good quality, it is important to minimize the contact clearance between plates in a groove for welding.

However, a relative positional relation between a robot grasping a component with its hand and the component varies in a small range, depending on, for example, the component machining accuracy or the component grasping accuracy. Thus, an uncertain factor is involved.

Such component machining error and robot component grasping error vary each individually and are extremely small amounts in comparison with motions of the robot, so it is impossible to reflect all of these points in the foregoing teaching of robot motions. For this reason, in the case of assembling plural components by contacting the components at respective faces, there arises the necessity of assembling the components while making such contact faces compatible with each other to correct a displacement caused by a component machining error or a component grasping error.

According to a known method for correcting such a displacement, which method intends to assemble components with a high accuracy, there is used a component positioning device including a hydraulic cylinder or the like. In this known method, each component is loaded to the positioning device, and after correction of a displacement, is again grasped by a robot at a predetermined position.

However, in assembling components with use of such a positioning device, it is required to use such a positioning device for each of similar components. Therefore, the case where the aforesaid known method can actually be applied is limited to the case where the number of components is small and the components are of limited sizes and shapes or to the case where products assembled by using components are mass-produced. Even if the above known method is applied to any of these cases, there arises a problem of increased equipment cost or a problem related to tact time.

Where a robot is to be used in fitting operation, it is usually required to use a positioning device at the time of supply of components, and even if components are supplied under positioning, the strictness of fit tolerance is to a further extent than the robot positioning accuracy. Additionally, for avoiding interference with a reaction force created in fitting operation, there is used a mechanical float or a compliance control.

The mechanical float permits face contact of different components, but the mechanism for holding the position and posture of abutted components is complicated and a mechanical float capable of controlling the aforesaid fitting operation in a six-axis structure has not been commercialized yet. In the use of a compliance control each component has six axes of freedom in a space, but five axes of freedom are restrained from a shaft-hole relation in fitting, and it is only one axis of freedom that can adjust motion in fitting operation. Thus, it is easy to effect control. However, controlling method and apparatus suitable for fitting, which employ such compliance control, are not applicable to the abutting operation for minimizing the contact clearance of faces generated in the mechanical assembly or canning assembly proposed herein, because the degree of freedom is not limited up to completion of the abutment.

In addition to the above mechanical float and compliance control there also has been commercialized a servo float function as a function which can adjust robot motions in a flexible manner and which is applicable to the aforesaid operation of abutting components between their faces. This servo float function is a robot controlling method in which, as described in Japanese Patent Laid Open No. 210251/95, a control system for a servo motor as a robot drive source is formulated using a feedback control system, and the rigidity of robot motions is varied by changing and adjusting various gains in the feedback loop for the motor, thereby making it possible to keep constant the flexibility of robot motions.

At present, as cases where the above servo float function is applied to assembling components under the control of robot motions, there are mentioned 1) a case where an external force exerted on the robot is turned aside at the sacrifice of positioning accuracy, 2) a case where, in assembling components, the posture of the robot itself is changed with a force which the robot generates, to follow the components, and 3) a case where the robot exerts a certain force on each component (Yasukawa Denki Technical Report, Vol. 59, No. 2). It is the case 2) that is close to the present invention. However, that the posture of the robot itself changes means that a target position which a component is to assume changes, even if it is possible to follow the component. Thus, it is impossible to assemble components with a high accuracy.

As described above, in the prior art where a component positioning device is used in addition to a robot and an assembly stand, there is no flexibility for the change of components, and the tact time becomes long. In the mechanical float, compliance control and servo float control not using a component positioning device, a component supply error, a component size error and a robot grasping error can be absorbed by a positioning action between components as in fitting operation, but in other cases there is the problem that it is impossible to ensure a high positioning accuracy even though it is possible to let the robot follow the contact faces of components.

Therefore, when a plurality of components each of which is not always satisfactory in machining accuracy are to be mutually contacted at their faces using a robot of six or more axes and are to be assembled at a target position within an allowable accuracy range while minimizing the clearance between the contact faces, it is desired that the components be assembled while adjusting the motion of each robot axis in a flexible manner to make the contact faces of components compatible with each other and that a plurality of components be assembled successively while maintaining a predetermined assembling accuracy. Besides, while maintaining such predetermined assembling accuracy, it is necessary that the cost of required equipment should not increase nor should the working time become long.

SUMMARY OF THE INVENTION

The present invention has been accomplished in view of the above-mentioned problem and it is an object of the invention to provide a component assembling method and equipment which adopt, for example, the known servo float function as a method for controlling the motion of each robot axis and which can thereby assemble plural components successively and can cope with the above-mentioned problem, while allowing components to contact each other at faces thereof and while maintaining a high component positioning accuracy.

According to the invention defined in claim 1, in order to achieve the above-mentioned object, there is provided a component assembling method using:

a reference table having at least two planes which are first and second reference planes different in the direction of normal line from each other; and a robot system for grasping and moving each component to a given position on the reference table, the method including at least:

a first step of pushing the component as grasped by the robot system against the first reference plane, changing the posture of the robot system to let the component lie along the first reference plane, and storing or fixing the change in posture of the robot system; and a second step, subsequent to the first step, of pushing the component as grasped by the robot system against the second reference plane, changing the posture of the robot system to let the component lie along the second reference plane, and storing or fixing the change in posture of the robot system, wherein the position of the component relative to the reference table is determined by correcting the posture of the component in accordance with the changes in posture stored in the first and second steps or by fixing the posture of the component in the first step and that in the second step successively.

For example, in the case where the first reference plane is X-Y plane in X-Y-Z coordinates, if a predetermined face of a component is pushed against Y-Y plane, Z coordinate, as well as the angles around X and Y axes, of the component are corrected. Where the second reference plane is X-Z plane, if a residual predetermined face of the component is pushed against X-Z plane, Y coordinate, as well as the angles around Z and Y axes, of the component are corrected. Where required, if the third reference plane is Y-Z plane and a residual predetermined face is pushed against Y-Z plane, X coordinate, as well as the angles around Y and Z axes, of the component are corrected.

By storing changes of posture in these correcting operations it is made possible to correct the posture of the component at the time of further moving the component. If changes of posture in these correcting operations are fixed, components are corrected in their posture successively in order.

In the invention defined in claim 2, which is applied to the case where two or more components are assembled in the invention of claim 1, the foregoing reference table is used as an assembly table for positioning the first component thereon, and thereafter the component thus positioned on the assembly table is used as the reference table for positioning the next component.

Although an assembly table is required for first positioning a component, once the component is positioned on the assembly table, it serves as a reference table for assembly of the next component.

In the invention defined in claim 3, the robot described in the invention of claim 1 has six or more axes of freedom and has servo float means capable of turning on and off which reduce the rigidity of robot motion by changing the control gain of each axis of the robot or by setting a torque limiter appropriately to follow the component to be assembled.

The servo float means which film the function thereof by changing control gains or setting a torque limiter appropriately can turn on and off, and the degree of operation thereof can be adjusted.

According to the invention defined in claim 4, in combination with the invention defined in claim 1, a first face for which is required the highest accuracy, out of the constituent faces of the component, is pushed against a reference plane as a first reference plane which is most parallel to the said face of the component, and a second face for which is required the second highest accuracy, out of the constituent faces of the component, is pushed against a reference plane as a second reference plane other than the first reference plane, the second reference plane being most parallel to the second face of the component.

In some case, the face of the component requiring the highest accuracy has the largest area. In such a case, if this largest face is pushed against the first reference plane, the influence of the second like operation on the first correction is diminished.

The invention defined in claim 5 relates to a component assembling equipment comprising a reference table for positioning a component, a robot for grasping and moving the component, and a control unit for controlling the robot, with position information of the component on the reference table being given in advance to the control unit, the reference table having a first reference plane (X-Y plane), a second reference plane (X-Z plane) and a third reference plane (Y-Z plane), which are different in the direction of normal line from one another, the robot having six axes of freedom (X, Y, Z, $\theta_x$, $\theta_y$, $\theta_z$) or more and having means for reading posture information of the robot, the control unit having servo float means which reduce the rigidity of robot motion by changing the control gain of each axis of the robot or by setting a torque limiter appropriately to follow the component to be assembled, means for calculating the difference between the posture information of the robot obtained by successive abutment of the component with the first, second and third reference planes and the position information given in advance, and correction means for correcting the position information of the robot on the basis of the difference calculated by the calculating means, wherein, before the robot positions the component on the reference table, the position information of the robot is corrected through abutment of the component with the first, second and third reference planes.

By successive abutment of the component with the first, second and third reference planes, it is possible to calculate the difference from each of pieces of position information pre-taught for all of six axes of freedom (X, Y, X, $\theta_x$, $\theta_y$, $\theta_z$), and when the component is to be further moved, its posture is corrected on the basis of the said difference.

The abutment of the component means that a face of the component and a reference plane or the like are contacted together while making the two compatible with each other and in this state the former is pushed against the latter.

The invention defined in claim 6 relates to a component assembling equipment comprising a reference table for positioning a component, a robot for grasping and moving the component, and a control unit for controlling the robot, with a position information of the component on the reference table being given in advance to the control unit, the reference table having a first reference plane X-Y plane), a second reference plane (X-Z plane), and a third reference plane (Y-Z plane), which are different in the direction of normal line from one another, the robot having six axes of freedom (X, Y, Z, $\theta_x$, $\theta_y$, $\theta_z$) or more, the control unit having servo float means which reduce the rigidity of robot motion by changing the control gain of each axis of the robot or by setting a torque limiter appropriately to follow the component to be assembled, and means for successively fixing the posture of each axis of the robot which posture is obtained upon successive abutment of the component with the first, second and third reference planes, wherein, when the robot positions the component on the reference table, the positioning is performed through successive abutment of the component with the first, second and third reference planes.

As the component is brought into abutment with the first, second and third reference planes in this order, the pieces of position information pre-taught for all of six axes of freedom (X, Y, X, $\theta_x$, $\theta_y$, $\theta_z$) are corrected in order.

According to the invention defined in claim 7, in combination with the invention defined in claim 6, the fixing means which fix the posture of each robot axis by making the servo float means in each robot axis inoperative after the successive operations of the servo float means involving abutting the component successively with the first, second and third reference planes to follow the planes.

Since the servo float means can turn on and off for each robot axis, the posture thereof after operation can be held inoperative.

In fixing the robot posture, what are concerned with the robot axes for which the servo float means are turned off are the axes of freedom (e.g. X, Y, Z) to be fixed in the space for component abutment and the robot axes which provide corresponding motions.

According to the invention defined in claim 8, in combination with the invention defined in claim 6, the fixing means cause the component to lie along at least one of the first, second and third reference planes and at the same time cause it to abut the other reference planes.

By thus abutting the component with the next reference plane while retaining its posture corrected by abutment with one reference plane, the correction of posture is accumulated.

According to the invention defined in claim 9, in combination with the invention defined in claim 6, in the case where the component to be assembled is of a shape which causes rotation of the component in excess of an error range upon abutment of the component with a reference plane, there are means which make the servo float means in a specific axis inoperative.

Unnecessary rotation of the component is prevented by the servo float means in a specific axis.

DETAILED DESCRIPTION OF A PREFERRED EMBODIMENT

An embodiment of the present invention will be described in detail hereinunder with reference to the accompanying drawings. In this embodiment, assembly of components is performed using a robot system shown in FIG. 1.

Figure 1:
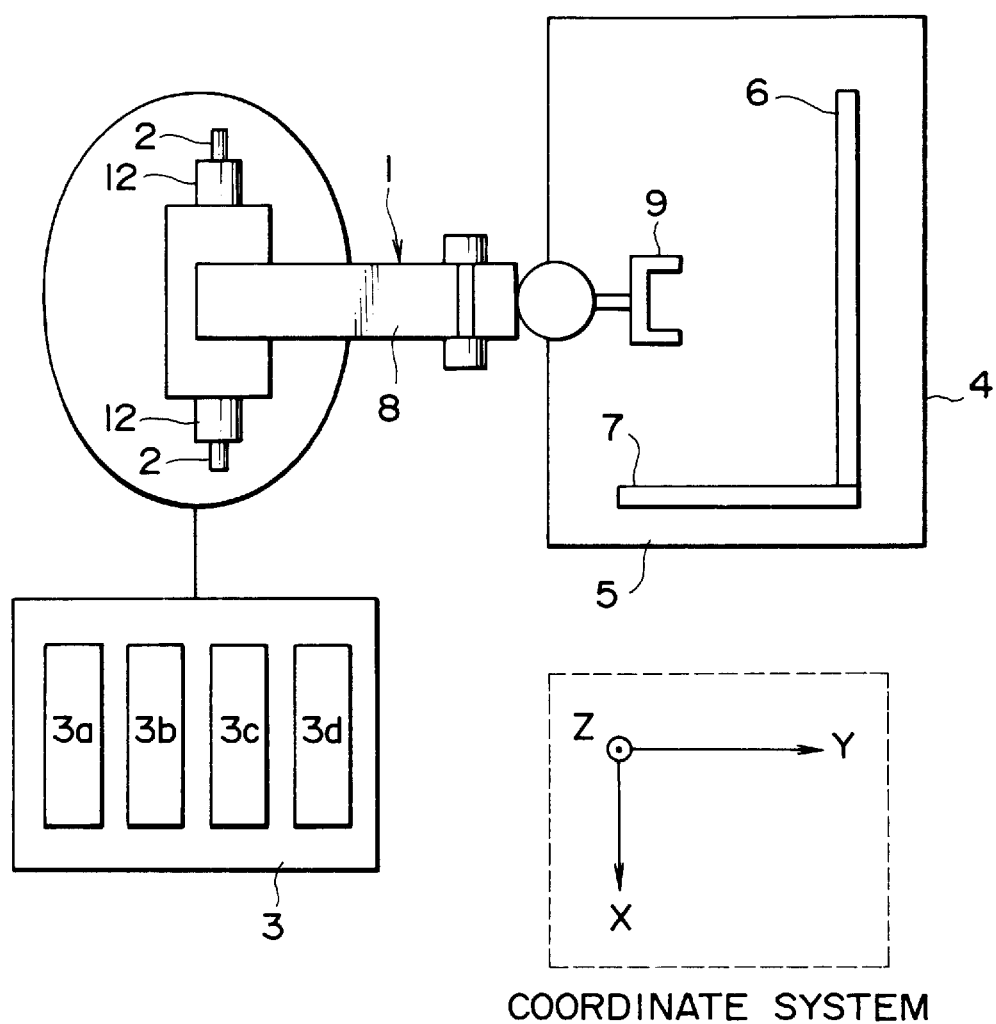
FIG. 1 is a diagram showing the whole of a robot system used in a component assembling equipment embodying the present invention.

The robot system shown in FIG. 1 comprises a robot 1, a control unit 3 for the robot 1, and an assembly table 4 which functions as a reference table for components to be assembled.

The robot 1 is a vertical multi-joint robot having six axes of freedom. The six axes are operated by servo drive using servo motors 12 as a drive source. It is possible to exercise a servo float function for the said servo drive system.

The robot 1 has a hand 9 at the front end of an arm 8 to grasp a component to be assembled. The hand 9 has one or two rotating shafts as component grasping shafts, with a freedom of one to two axes, but does not possess the aforesaid servo float function. A mechanical float function is exercised for all of the six axes of the robot 1. A sensor 2 is attached integrally to each of the servo motors 12 for driving the axes of the robot 1. The sensors 2 constitute means for detecting an operating position of the robot 1 and the angles of the robot axes at an arbitrary time point.

The control unit 3 controls the component assembling operation of the robot. The control unit 3 has control modes corresponding to component assembling methods. In this embodiment the control unit 3 has four control modes 3a, 3b, 3c and 3d. In the control unit 3 is incorporated a software for exercising a servo float function capable of turning on and off for all of the six axes of the robot 1.

Figure 2:
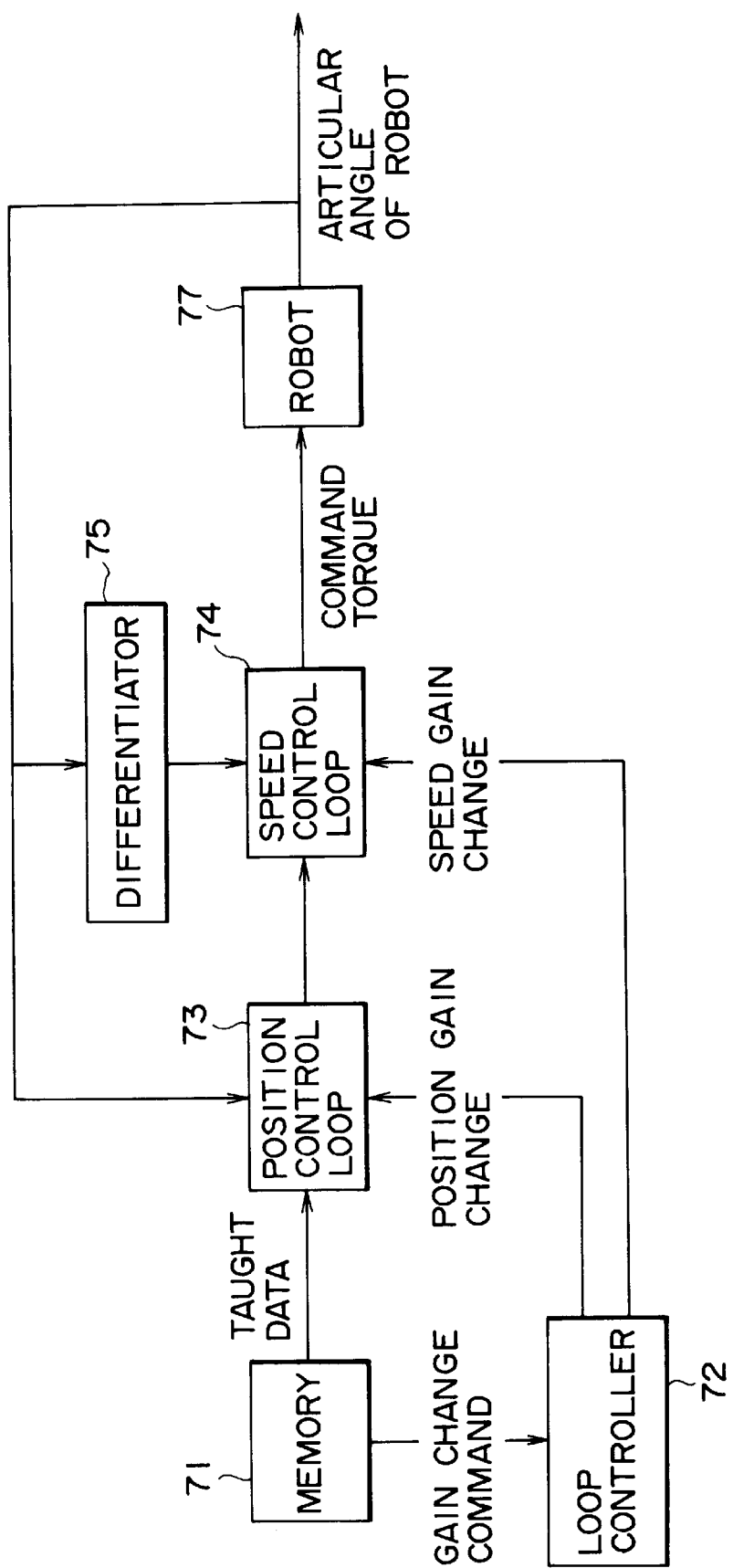
FIG. 2 is a block diagram of a gain changing type servo float control.
Figure 3:
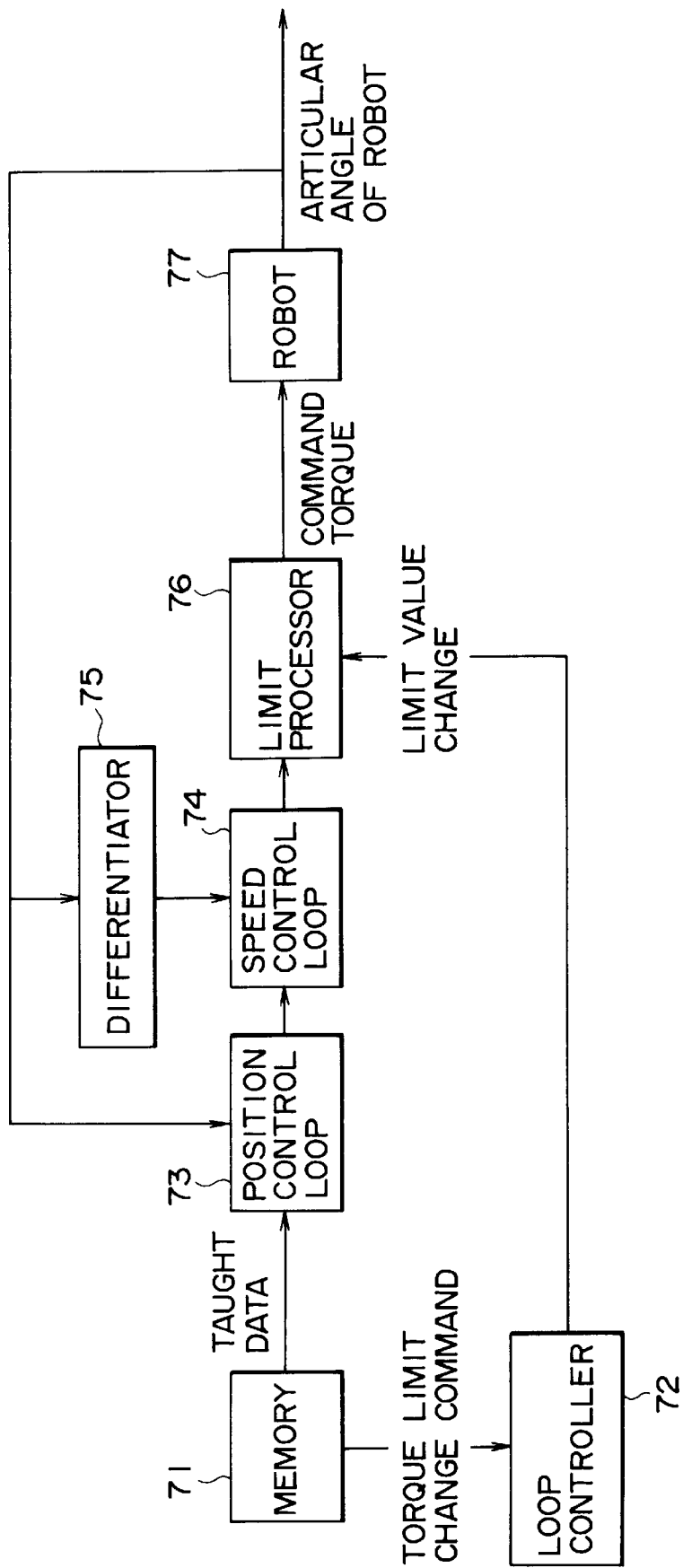
FIG. 3 is a block diagram of a torque limiter changing type servo float control.

Description is now directed to typical control loops in a servo float control with reference to FIGS. 2 and 3. FIG. 2 illustrates control loops in a gain changing type servo float control.

In a memory 71 are stored teaching data prepared in advance in connection with the position to which the robot is to move, etc.

In accordance with the control data stored in the memory 71, a loop controller 72 changes the position gain of a position control loop 73 and the speed gain of a speed control loop 74.

The said control data describe a relation between the above two gains and the output torque of a motor, though not illustrated in the drawing.

At a predetermined position gain the position control loop 73 controls the position to which the robot is to move. The position of each articular angle of the robot 77 is fed back to the position control loop 73.

At a predetermined speed gain the speed control loop 74 controls the robot moving speed and issues a command on the output torque of a motor which is required for a robot 77 to attain a target speed.

With the above torque, each joint of the robot 77 is driven to take a target angle, whereby a component to be assembled is moved to a target position.

A differentiator 75 differentiates each articular angle position of the robot 77 and feeds the value obtained back to the speed control loop 74.

According to this control method, while the robot moves to the taught position stored in the memory 71, the rigidity of its motion can be adjusted by the foregoing change of gain to adjust the output torque.

FIG. 3 illustrates control loops in a torque limiter changing type servo float control.

In this control system, unlike the control system shown in FIG. 2, a certain upper limit is established for the output torque of a motor. Main differences from the control system shown in FIG. 2 reside in the following: i) the loop controller 72 sets a limit value of torque and ii) a limit processor 76 is provided. This limit value of torque is stored in the memory 71 though not shown. The limit value of torque stored in the memory 71 can be changed within a certain range by means of an input device (not shown). Upon change of the torque limit value, the loop controller 72 receives a torque limit change command and sets a new limit value for the limit processor 76, which in turn provides a command on the motor output torque within a range not exceeding the said limit value.

According to this control method, since the motor output torque is kept to a value not larger than a predetermined certain value even under movement to the taught position stored in the memory 71, the robot, or the component carried by the robot, can move smoothly without undergoing any excessive force. In FIG. 3, the position gain change command and speed gain change command shown in FIG. 2 may be issued to the position control loop 73 and the speed control loop 74, respectively, in parallel with a limit value change signal provided from the loop controller 72.

The assembly table (the initial reference table) 4 is a working area to which the robot 1 carries components for successive assembly of the components. As shown in FIG. 1, a coordinate system for the assembly table 4 is represented by an orthogonal coordinate system composed of X, Y and Z axes which are orthogonal to one another.

The assembly table 4 comprises an assembly plane 5 as a first reference plane, a vertical reference plane as a second reference plane 6 extending in the longitudinal direction, and a vertical reference plane as a third reference plane 7 extending in the transverse direction. In the above coordinate system, the assembly plane 5, longitudinal vertical reference plane 6 and transverse vertical reference plane 7, correspond to X-Y, X-Z and Y-Z planes, respectively.

The following description is now provided about a concrete procedure for assembling components which is performed by the robot 1 in accordance with a command issued from the control unit 3.

Figure 4A:
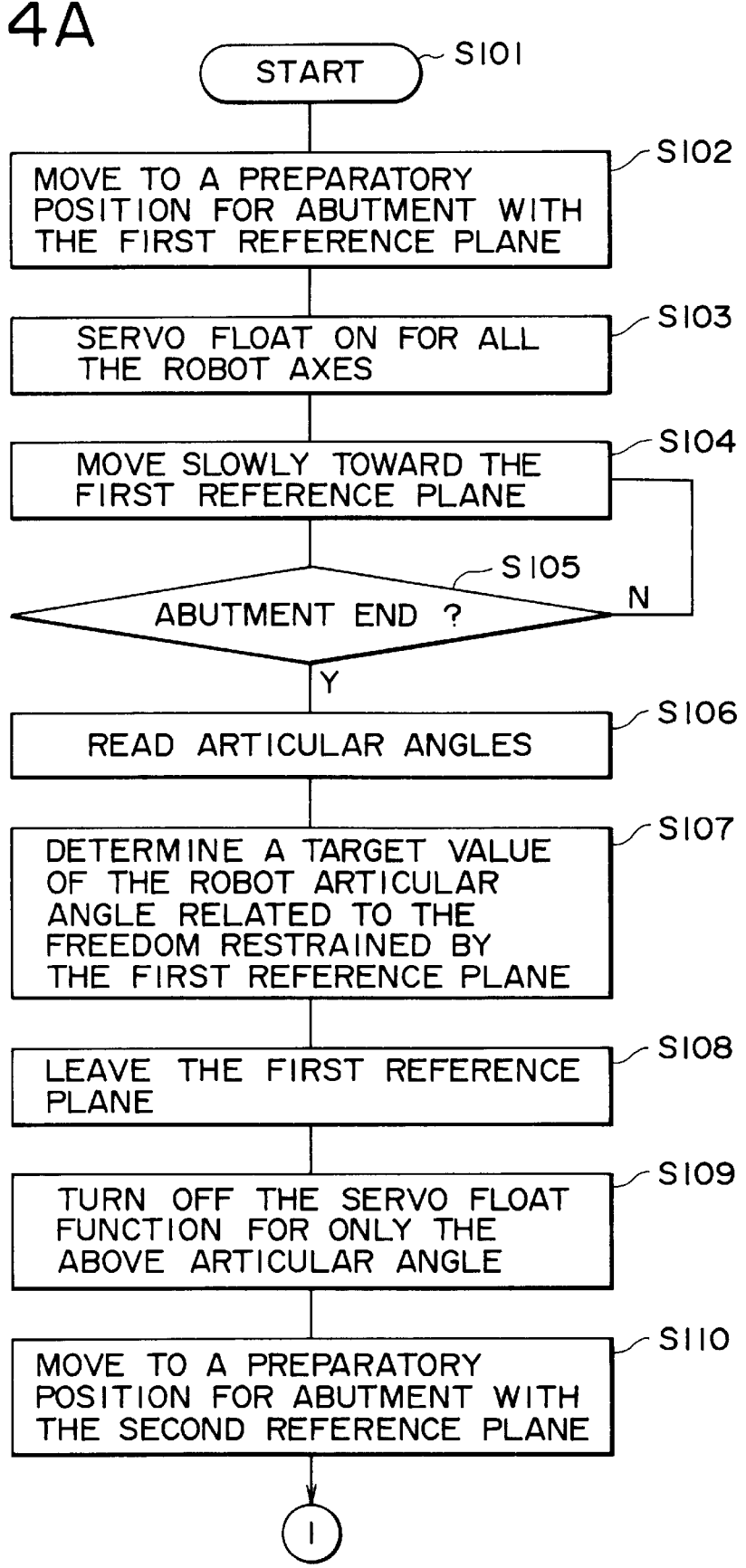
FIG. 4 is an entire flow chart relating to robot control (first mode)
Figure 4B:
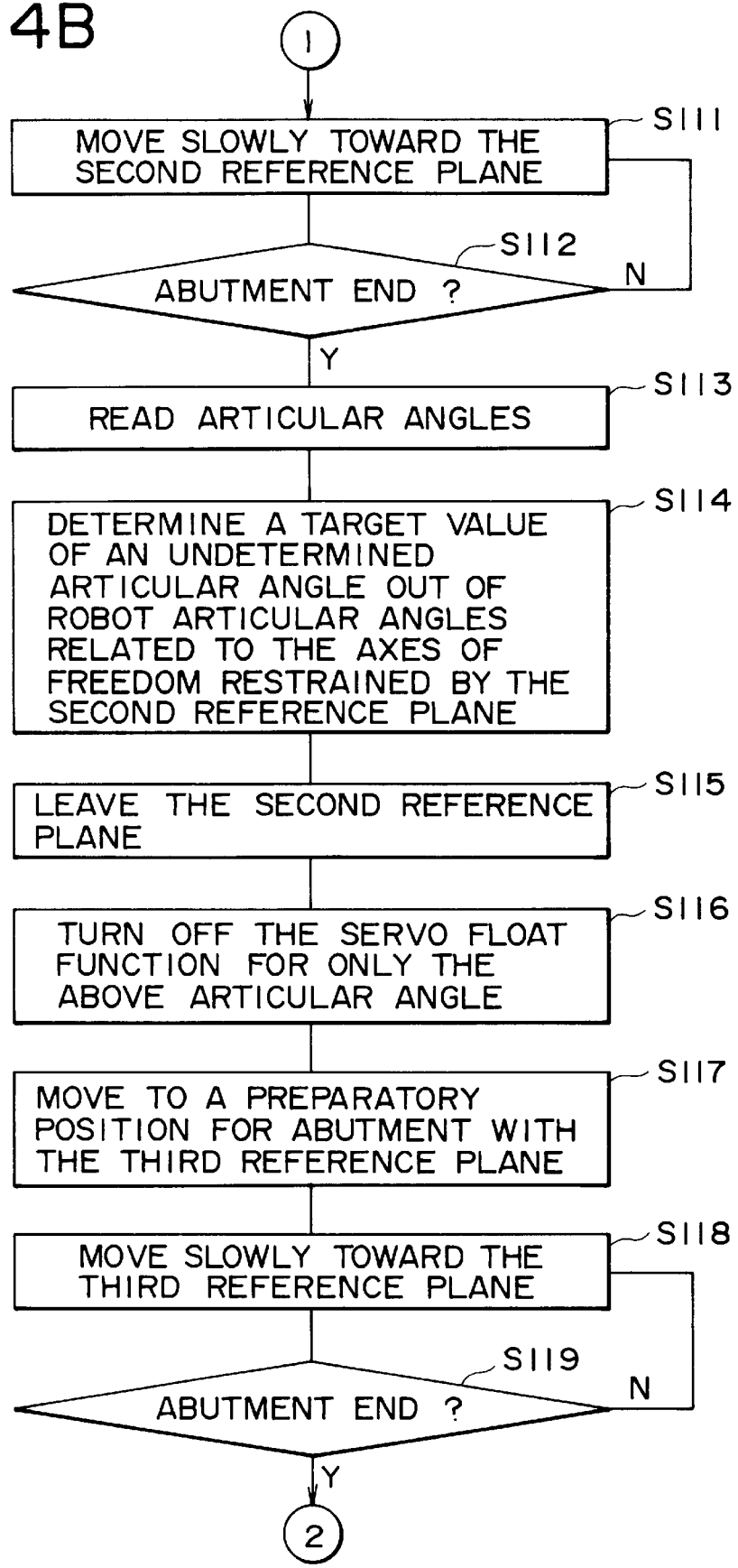
Figure 4C:
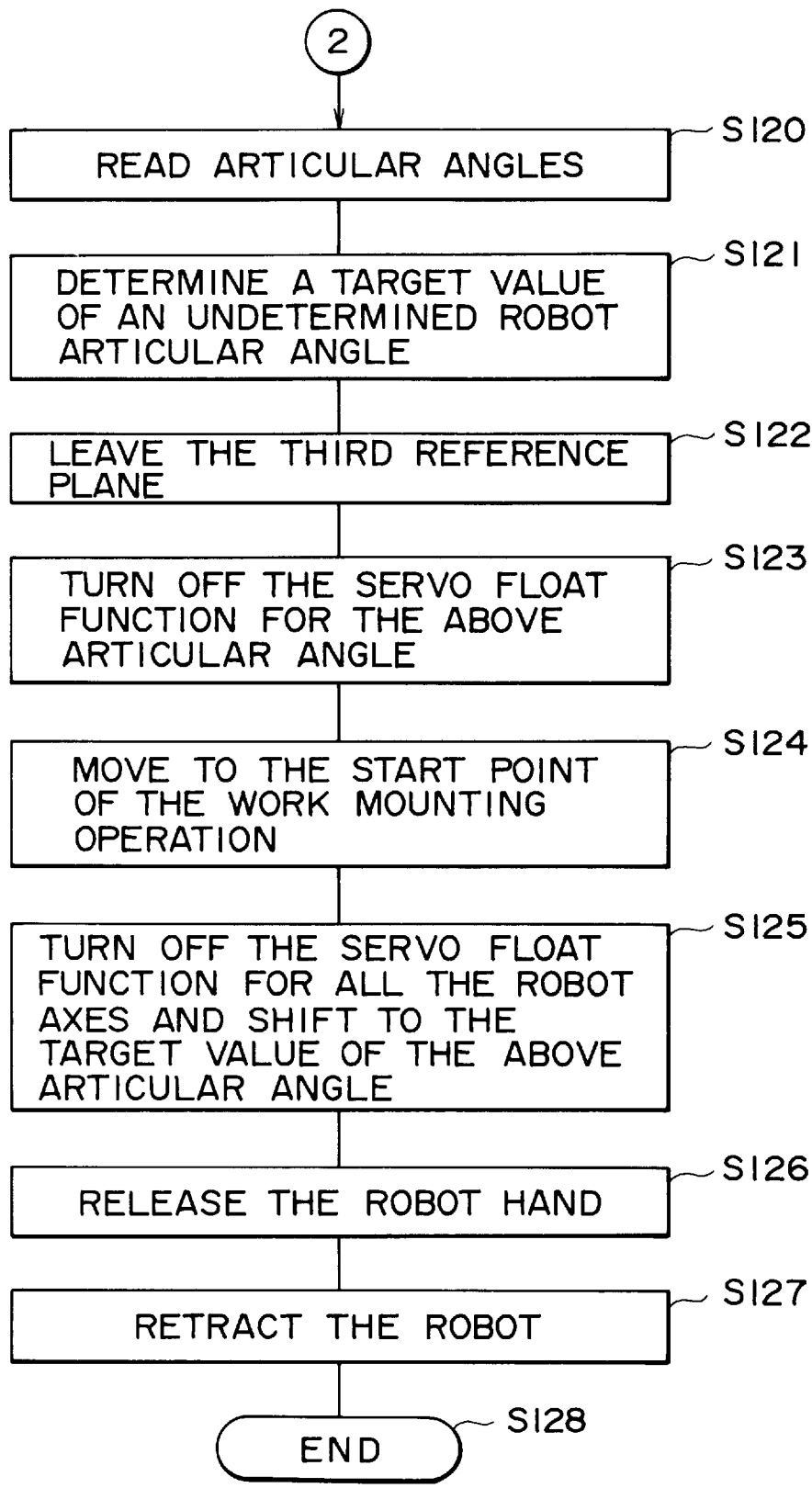

In a first control mode 3a (see FIG. 1) of the control unit 3, a plurality of components to be assembled are brought into abutment with a plurality of reference planes, and it is possible to determine a target value of each robot axis related to the freedom of each component which is restrained by abutment thereof with the associated reference plane. This procedure will be outlined below in accordance with the flow chart of FIG. 4.

When the control mode 3a is selected (step S101), a component to be assembled is moved toward an abutment position on the first reference plane (S102). Servo float function is exercised for all of the robot axes (S103). The component is brought into abutment with the first reference plane taught in advance (S104→S105, YES), and a change in posture caused by a component size error or a component grasping error is read from an articular angle of each robot axis (S106), followed by calculation of a discrepancy of each articular angle. Thereafter, correction is made for a target value of an articular angle which exerts the greatest influence on the freedom of the component restrained upon abutment with the first reference plane (S107), followed by disengagement from the first reference plane (S108) and subsequent cancellation of the servo float function for the above articular angle (S109).

Once this procedure is performed, the component is corrected its posture for the first reference plane, but since this correction is only part of the correction required, the procedure of steps S110 to S123 is carried out for making correction with respect to the second and third reference planes. The contents of this procedure are the same as the contents of the procedure of steps S102 to S109 applied to the first reference plane. When the correction of component posture for all the reference planes is over, the robot moves to the position where the component is to be mounted (S124), followed by cancellation of the servo float function for all the robot axes and subsequent shift to the target value of the articular angle (S125). Thereafter, the robot hand 9 is disengaged from the component (S126) and the robot is retracted (S127). The component assembling work is now over (S128).

In a second control mode 3b of the control unit 3 (see FIG. 1), at the time of assembling plural components successively in order, articular angles of the robot are stored at every abutment with one reference plane, then when the abutment with the reference plane is completed, or after the completion of abutment with all the reference planes, the position and posture in which each component are to be mounted are calculated from those articulation data, and the component is mounted with the thus-calculated value as a control target.

Figure 5A:
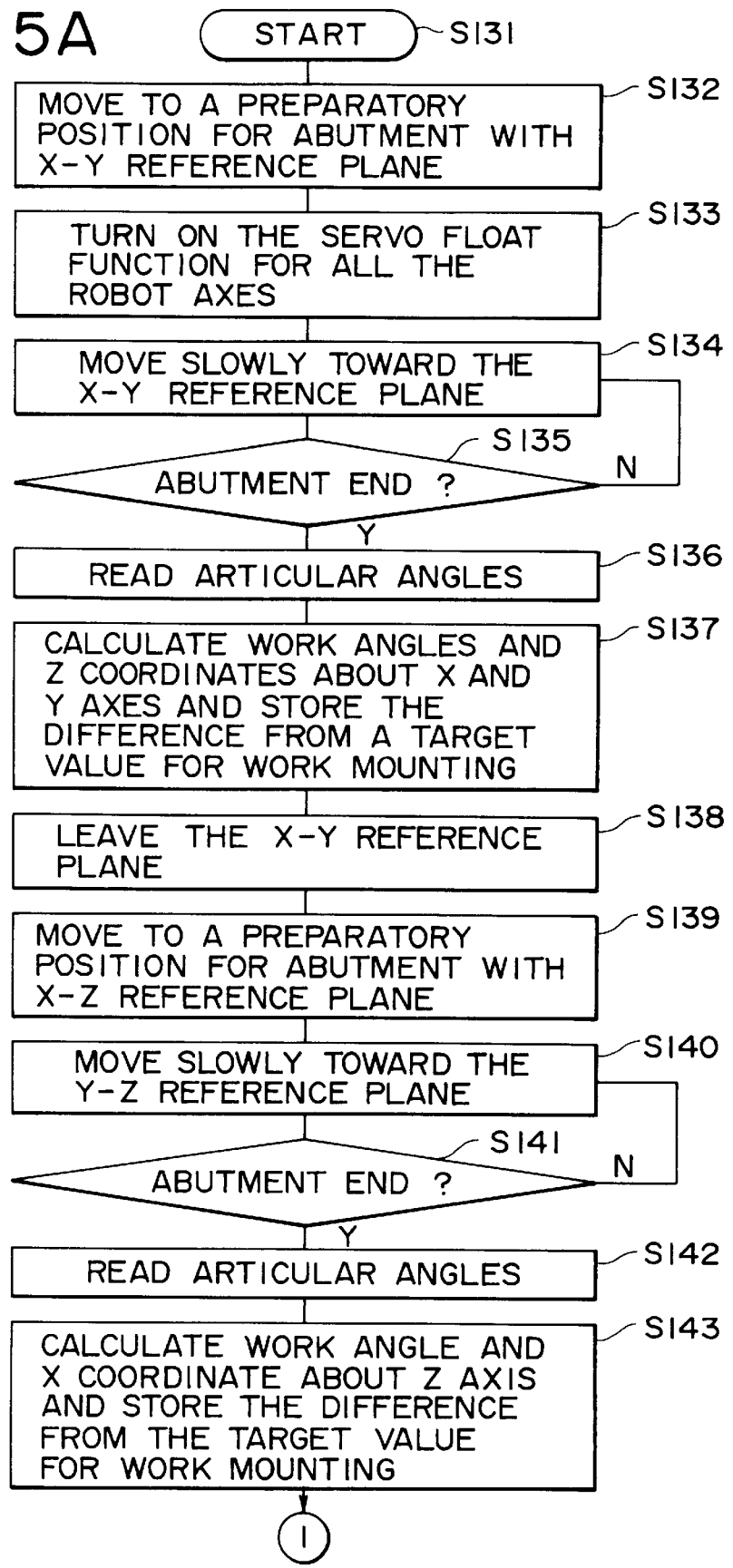
FIG. 5 is an entire flow chart relating to robot control (second mode)
Figure 5B:
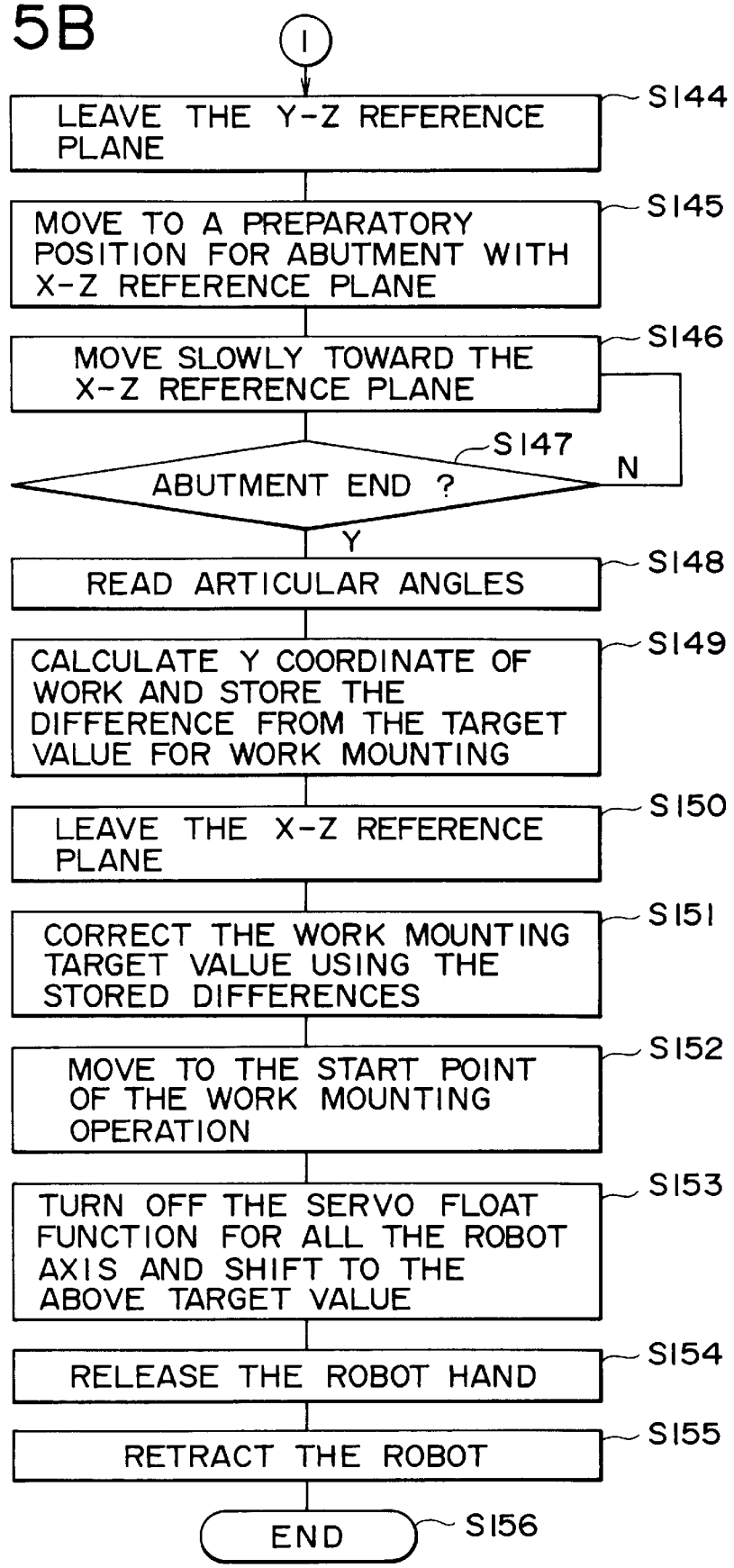

This procedure will be outlined below in accordance with the flow chart of FIG. 5. Reference planes in the following description are assumed to be X-Y, Y-Z and X-Z reference planes.

When the control mode 3b is selected (S131), the robot moves toward an abutment position on the X-Y reference plane (S132). Servo float function is exercised for all the robot axes (S133). The component is brought into abutment with the X-Y reference plane taught in advance (S134→S135, YES), and a change in posture of the component upon abutment induced by a component size error or a component grasping error is read from an articular angle of each robot axis (S136). Thereafter, component angles around X and Y axes, as well as Z coordinate of the component, are calculated, and difference thereof from a target value for mounting of the component is stored (S137). Subsequently, the component leaves the X-Y reference plane (S138).

Then, the procedure of steps S139 to S149 is carried out, and by abutment of each component with Y-Z and X-Z reference planes there are successively obtained information on the position and position in which the component is to be mounted.

The contents of this procedure are the same as that of the procedure of steps S132 to S137 performed for the reference plane X-Y. Upon abutment with the Y-Z reference plane, there are calculated a component angle around Z axis and X coordinate of the component, then the difference thereof from the target value for mounting of the component is taken (S143). Likewise, by abutment with the X-Z reference plane, the difference of Y coordinate of the component from the target value for mounting of the component is obtained (S149), whereupon the component leaves the X-Z reference plane (S150).

In accordance with the differences thus stored in the above procedure the (S137, S1443, S149), the target value for mounting of the component is corrected (S151).

Next, the robot moves to the component mounting position (S152).

The servo float function for all the robot axes is canceled and the robot moves to the above target position (S153). Thereafter, the robot hand 9 is released (S154), the robot is retracted (S155), and now the component assembling work is over (S156).

In a third control mode 3c of the control unit 3 (see FIG. 1), at the time of assembling plural components successively, the servo float function is exercised for all the robot axes and in this state each of the component is brought into successive abutment with reference planes, and after abutment thereof with the final reference plane, the robot hand is released.

Figure 6:
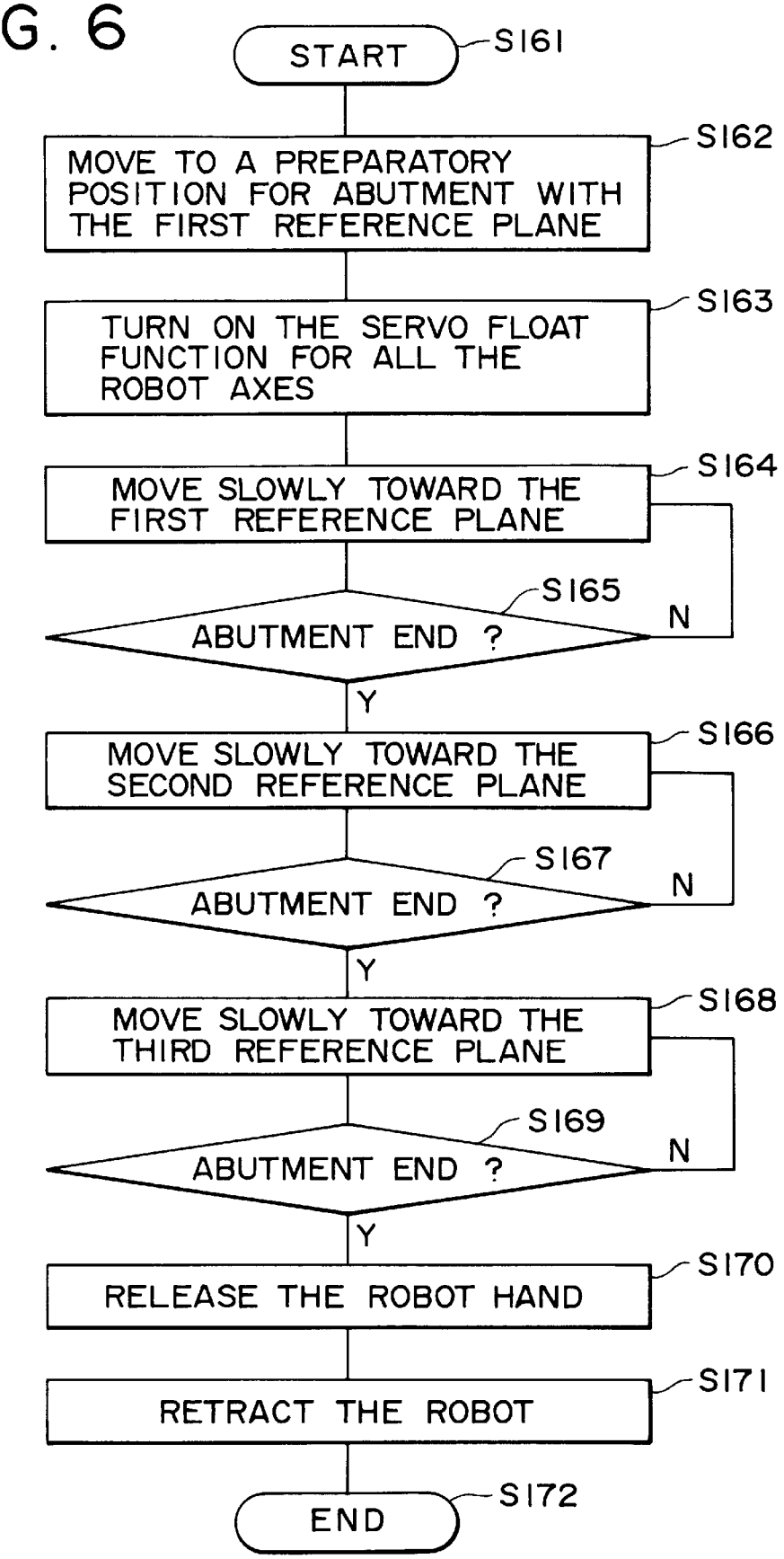
FIG. 6 is an entire flow chart relating to robot control (third mode)

This procedure will be outlined below with reference to the flow chart of FIG. 6.

When the control mode 3c is selected (S161), the robot moves toward an abutment position on the first reference plane (S162). The servo float function is exercised for all the robot axes (S163). Each component to be assembled is brought into abutment with the first reference plane taught in advance (S164→S165, YES). When the abutment with the first reference plane is over, the robot moves to the second reference plane (S166) and the component is brought into abutment with the second reference plane (S167), followed by abutment with the third reference plane in the same manner (S169). Thereafter, the robot hand 9 is released (S170), and the robot is retracted (S171). Now, the component assembling work is over (S172).

In a fourth control mode of the control unit 3 (see FIG. 1), a general control for robot operations, namely, the procedure for reproducing operations at pre-taught points, is executed.

Concrete procedures for the component assembling work using the robot 1 will be described below separately as paragraphs A and B. In the following description it is assumed that components to be assembled are fed to a position near the assembly table 4 while being carried on a pallet 10, and that the position and posture for operation of the robot 1 in mounting the components are taught beforehand. Explanation is here omitted about these works to be done prior to the component assembly in the invention.

As to a general procedure for correcting pre-taught positions using the servo float function, it will be described later in paragraph C.

As to the method of abutting components at their faces and detecting completion of the abutment, it will be described later in paragraph D.

A. Assembly with priority given to the state of face contact between components (see FIGS. 7 and 8)

A flat plate as a base plate (base plate 11a) is put on the first reference plane 5 of the assembly table 4, and a vertical flat plate (vertical plate 11b) is further placed on the base plate 11a, followed by tack welding into an assembled product of FIG. 7(b).

Figure 8:
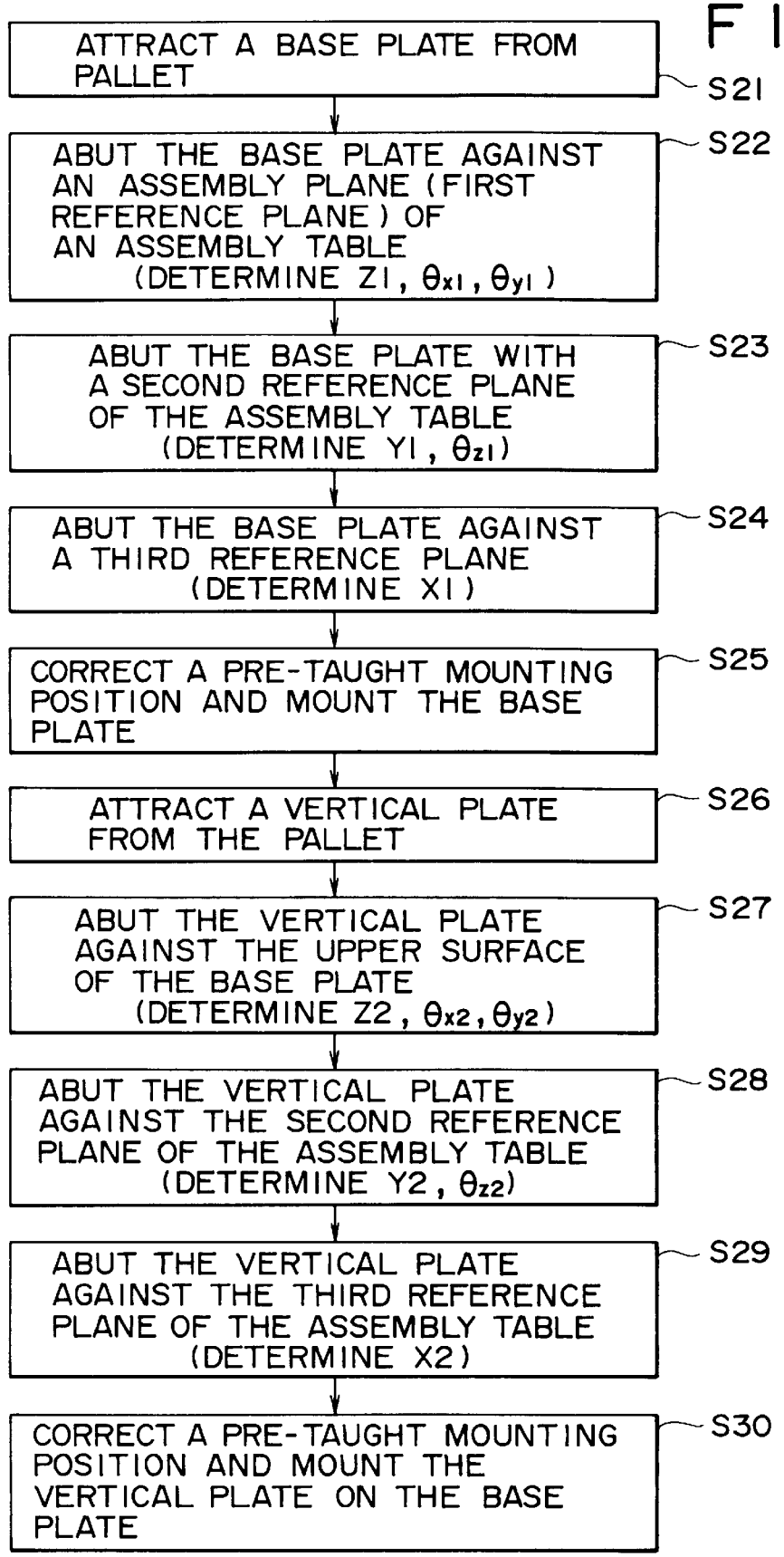
FIG. 8 is a flow chart showing procedure of the assembling steps in FIG. 6.

The procedure of this work will be described below with reference to the flow chart of FIG. 8.

Figure 7:
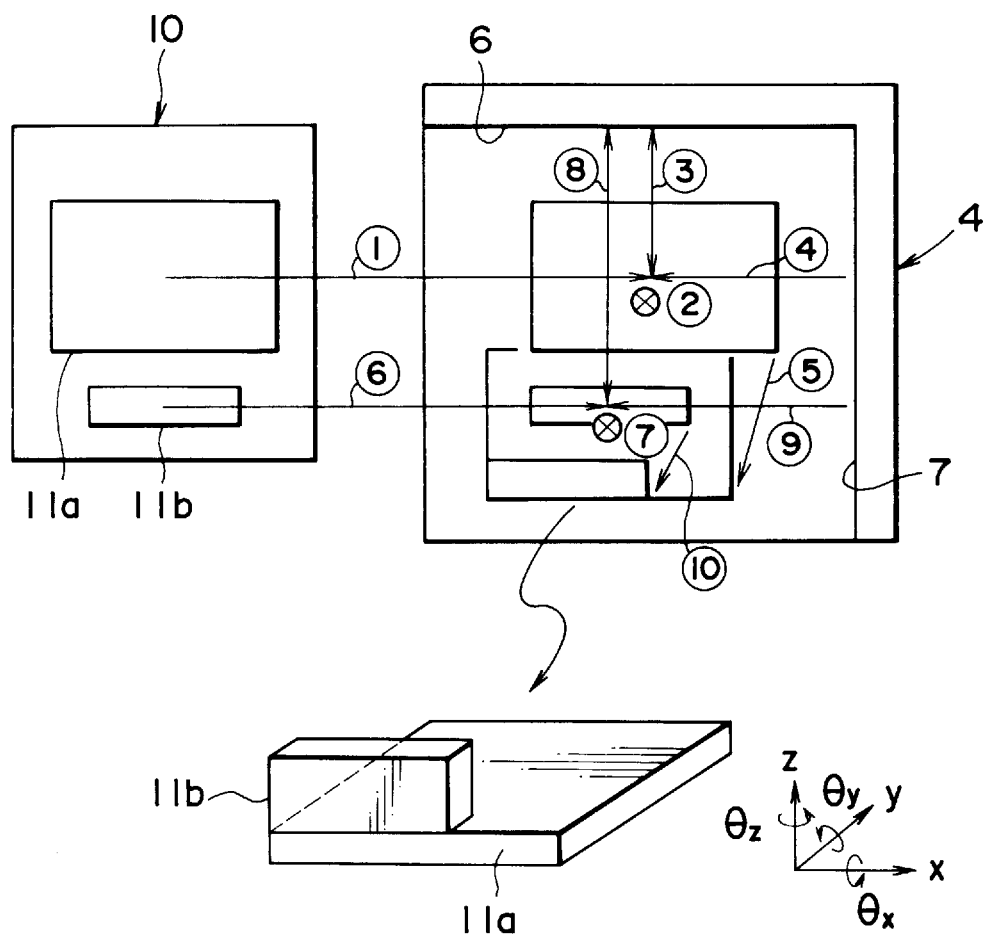
FIG. 7 is an assembly process diagram, with priority being given to the state of face contact between components.

(1) The base plate 11a is attracted by a magnet hand (not shown) from above a pallet 10 and is fed onto the assembly table 4, as indicated with arrow ① in FIG. 7 (S21). The robot holds the base plate 11a horizontally with respect to the assembly table 4 by means of its hand 2 and is opposed exactly to the assembly table 4. It is assumed that the posture at which the robot holds the base plate 11a and the position at which the robot is exactly opposed to the assembly table 4, have already been taught to the robot.

(2) With the robot, the lower surface of the base plate 11a as held in the above manner is brought into contact and abutment with the first reference plane 5 (② in FIG. 7, S22). At the time of this abutment, the servo float function is exercised for all the six axes of the robot. The position and posture of the robot during this abutting motion are somewhat different from those taught in advance, as mentioned previously in connection with the prior art.

At this time, articular angles of six axes are read and stored.

By performing predetermined calculations for the articular angles of six axes there are determined Z1 as Z coordinate in the orthogonal coordinate space, θx1 as an angle about X axis, and θy1 as an angle about Y axis (S22).

(3) Next, the base plate 11a is brought into abutment with the second reference plane 6 or the third reference plane 7.

As to with which of the second and third reference planes 6, 7 the base plate 11a is to be first abutted, priority is given to the assembling accuracy. To be more specific, in connection with a relative positional relation between the vertical plate 11b to be assembled next and the base plate 11a, if it is required to mount the components with a higher accuracy in the transverse positional relation in FIG. 7, priority is given to abutment with the third reference plane 7. If both are equal to each other in point of accuracy, priority is given to a face of a larger area of the base plate 11a and the said face is brought into abutment first with the second reference plane 6.

It is here assumed that the area of the vertical plate 11b relative to the second reference plane 6 is larger.

In this case, the base plate 11a is brought into abutment with the second reference plane 6, as indicated with arrow ③ in FIG. 7, (S23).

While the work for abutment with the second reference plane 6 is performed, the servo float function may be exercised for all the six axes of the robot, but as to the axes of the robot which exerts the greatest influence on the Z coordinate (say the second axis and the two rotary axes of the wrist which exert the greatest influence on the angles about X and Y axes), the servo float function may be canceled after disengagement from the abutted state and after establishing a corrected target value on the basis of the articular angles of the robot which were read at the time of the abutment.

When the abutment of the base plate 11a with the second reference plane 6 is over, articular angles of the six axes are read and stored.

By performing predetermined calculations for those articular angles there are determined Y1 as Y coordinate of the base plate 11a and θz1 as an angle about Z axis (S23).

(4) Next, the base plate 11a is brought into abutment with the third reference plane 7, as indicated with arrow ④ in FIG. 7 (S24). While the work for abutment with the third reference plane 7 is performed, the servo float function may be exercised for all the six axes of the robot, but as to the axes of the robot which exerts the greatest influence on Z coordinate, Y coordinate, and the angles about X, Y and Z axes, for example, the second and third axes of the robot and three rotary axes of the wrist, the servo float function may be canceled.

When the abutment of the base plate 11a with the reference plane 2 is over, articular angles of the six axes are read and stored.

By performing a predetermined calculation for each of those articular angles there is determined X1 as X coordinate of the base plate 11a (S24).

(5) In the case where the base plate 11a as abutted with the first and second reference planes 6, 7 is not mounted, a pre-taught mounting position is corrected on the basis of both orthogonal coordinate values of the base plate determined as above and known component dimensions (S25). Angles of the robot axes corresponding to the said mounting position are calculated on the basis of both coordinates of the mounting position and the rotational angles about the coordinate axes determined as above, and the base plate 11a is mounted (arrow ⑤ in FIG. 6, S25).

In the case where the base plate 11a is mounted in abutment with the first and second reference planes 5, 6, the values stored in the above steps (2), (3) and (4) are selected and the base plate is mounted on the basis thereof.

(6) Next, as indicated with arrow ⑥ in FIG. 7, the vertical plate 11b is attracted by the magnet hand from above the pallet 10 and is fed onto the assembly table (S26).

The robot holds the vertical plate 11b vertically with respect to the assembly table 4 and exactly faces the assembly table.

(7) As indicated at ⑦ in FIG. 7, the robot brings the vertical plate 11b into abutment with the upper surface of the base plate 11a so that the lower surface (the first reference plane 5) of the vertical plate contacts the base plate upper surface (S27).

The abutment is effected so as to minimize the contact clearance between the vertical plate 11b and the base plate 11a by virtue of the servo float effect.

At this time, articular angles of the six axes are read and stored.

At this time, by performing predetermined calculations for the articular angles of the six axes there are determined Z2 as Z coordinate of the vertical plate 11b, θx2 as an angle about X axis, and θy2 as an angle about Y axis (S27). In the case of a control item wherein the verticality of the vertical plate 11b takes precedence over the degree of contact thereof with the base plate 11a, θx2 is not determined at this stage, but is determined at the time of abutment with the second reference plane 6.

(8) Next, the robot brings the vertical plate 11b into abutment with the second reference plane 6, as indicated with arrow ⑧ in FIG. 7 (S28). It is the same as in the above (3) that the servo float function may be exercised in the abutment work or may be canceled for the robot axes which exert an influence on positioning for example. Articular angles of the six axes in this abutment are read and stored.

By performing predetermined calculations for articular angles of the six axes at this time there are determined Y2 as Y coordinate of the vertical plate 11b and θ, z2 as an angle about Z axis (S28). In the case where priority is given to the verticality of the vertical plate 11b as mentioned above, θx2 is determined on this occasion.

(9) Next, the vertical plate 11b is brought into abutment with the third reference plane 7, as indicated with arrow ⑨ in FIG. 7 (S29). It is the same as in the above (4) that the servo float function may be exercised in the abutment work or may be canceled for the robot axes which influence positioning for example.

At this time, articular angles of the six axes are read and stored. By performing predetermined calculations for the articular angles of the six axes there is determined X2 as X coordinate of the vertical plate 11b (S29).

(10) As in the above (5) relating to the base plate, if the vertical plate 11b in the thus-abutted state is not mounted, a pre-taught mounting position thereof is corrected in accordance with the data on the position of the vertical plate obtained above in steps (7) to (9) and the angles of the robot axes stored in those steps are selected to mount the vertical plate 11b onto the base plate (S30).

A plurality of components can be mounted an order by repeating the above steps (6) to (10).

Although in the above description the lower surface of each component is first brought into contact with the assembly table 4, it is desirable that the component faces be abutted with the assembly table in order of strictness of requirement for abutment accuracy. The component face to be first brought into such abutment is first abutted with a reference plane which is most parallel to the component face. Adoption of this order is suitable particularly in the case where importance is attached to the state of contact between faces as in temporary welding. Upon abutment, tilting may cause a positional error or an angular error, depending on the angle accuracy of a cut plate section. Preferably, depending on to which of position accuracy, angle accuracy and the degree of contact between components priority is to be given, and upon abutment of a component with a reference plane which restricts the degree of freedom, the degree of freedom of the component is determined. An example is the foregoing θx2 determining method.

Figure 9:
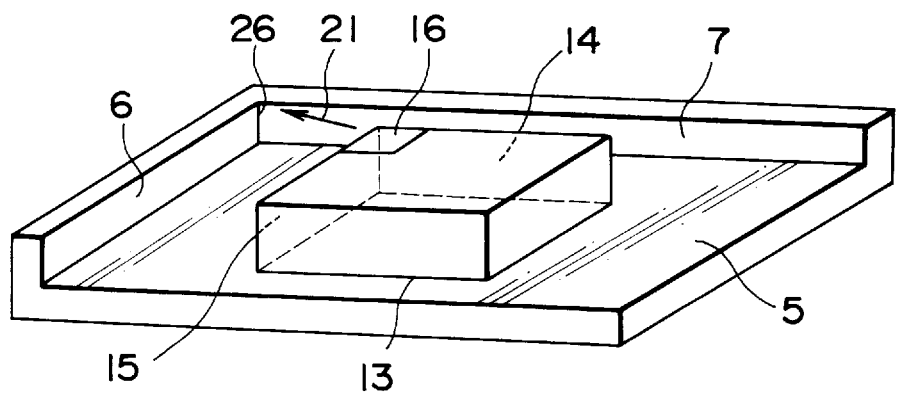
FIG. 9 is an assembling process diagram in which abutments of a component with two reference planes are performed almost simultaneously.

Unlike the procedure shown in FIG. 7 in which the abutment of each component with the second reference plane 6 is followed by abutment with the third reference plane 7, such a procedure as shown in FIG. 9 will be described below in which the abutment with the second reference plane 6 and the abutment with the third reference plane 7 are performed almost simultaneously.

This method is applicable to the case where components are designed so that two adjacent faces of the second and third reference planes and two adjacent faces 14 and 15 of a component become parallel respectively. More specifically, as shown in FIG. 9, the face 14 of a component 13 to be assembled is in parallel with the third reference plane 7, and the face 15 of the component 13 is in parallel with the second reference plane 6, as shown in FIG. 9. Thus, two faces of a component can be abutted with reference planes at a time.

Figure 10:
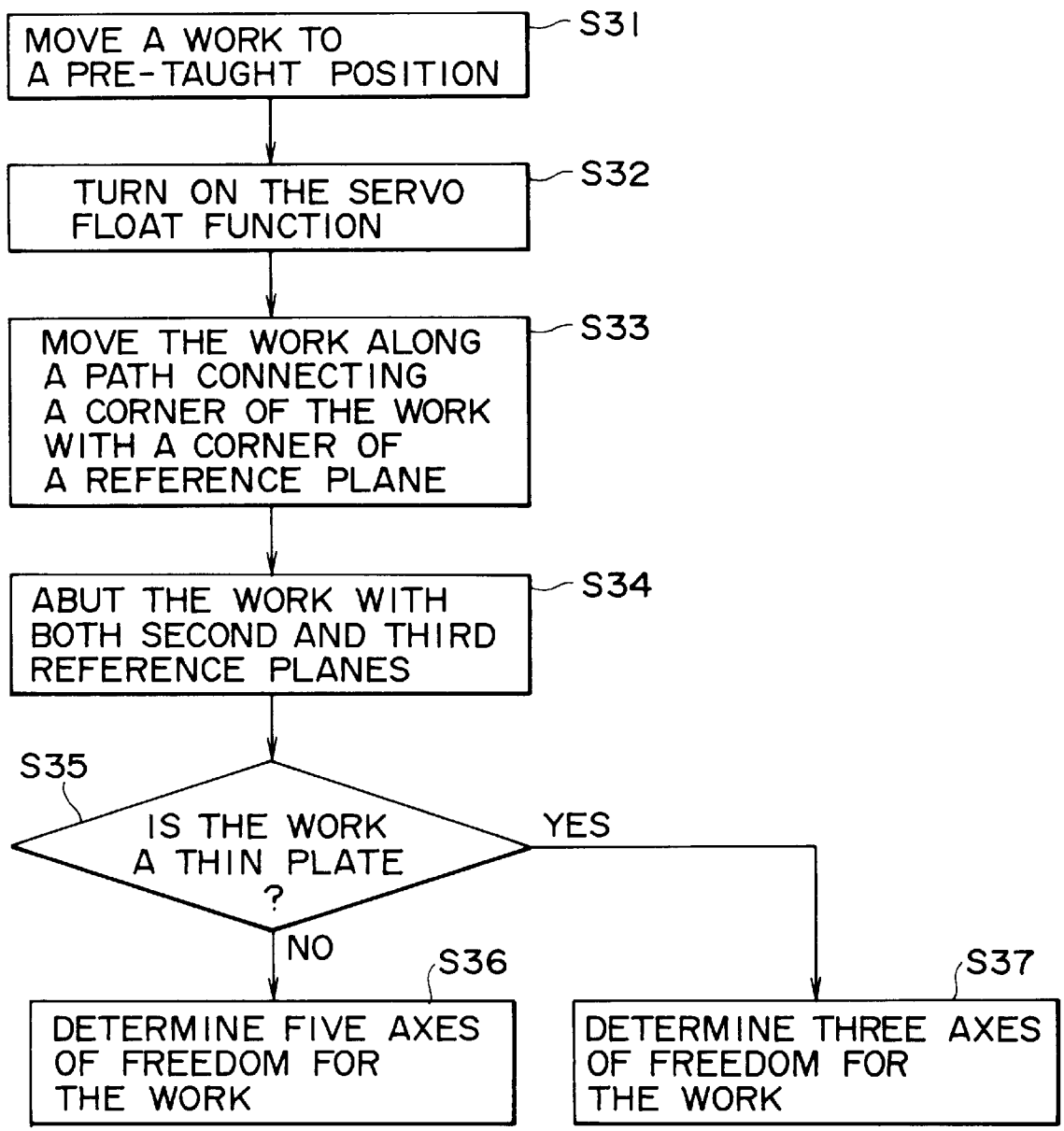
FIG. 10 is a flow chart showing procedure of the assembling steps in FIG. 8.

The procedure for abutment will be described below with reference to the flow chart FIG. 10.

That the spacing between the face 14 and the third reference plane 7 and the spacing between the face 15 and the second reference plane 6 are set almost equal to each other is taught to the robot in advance, and the component 13 is moved to this pre-taught position (S31).

The servo float function is exercised for all the six robot axes (S32), and the component 13 is moved toward both second and third reference planes at a time along a path 21 connecting a corner 16 of the component located between the faces 14 and 15 at the pre-taught position and posture of the component with a corner 26 located between the third and second reference planes 7, 6 (S33). Then, the faces 15 and 14 are brought into abutment with the second and third reference planes 6, 7, respectively, in an almost simultaneous manner (S34).

If the component is a plate not so thick (S35, YES), it is impossible to determine the rotation about a long side of its abutted face, so there are determined three degrees of freedom which are an intra-plane rotational angle of the plate and coordinate values of two sides (S37).

If the component is thick like a cube (S35, NO), it is also possible to determine the above rotation, so five axes of freedom, which are rotational angles about three axes and coordinate values of two sides, can be determined (S36).

As to a component having three faces parallel to the reference planes 5, 6 and 7, the three faces can be simultaneously abutted with the reference planes. In this case, six axes of freedom of the robot can be determined in a single abutment work. That is, the number of operations required for abutment can be decreased and hence it is possible to shorten the working time.

Figure 11:
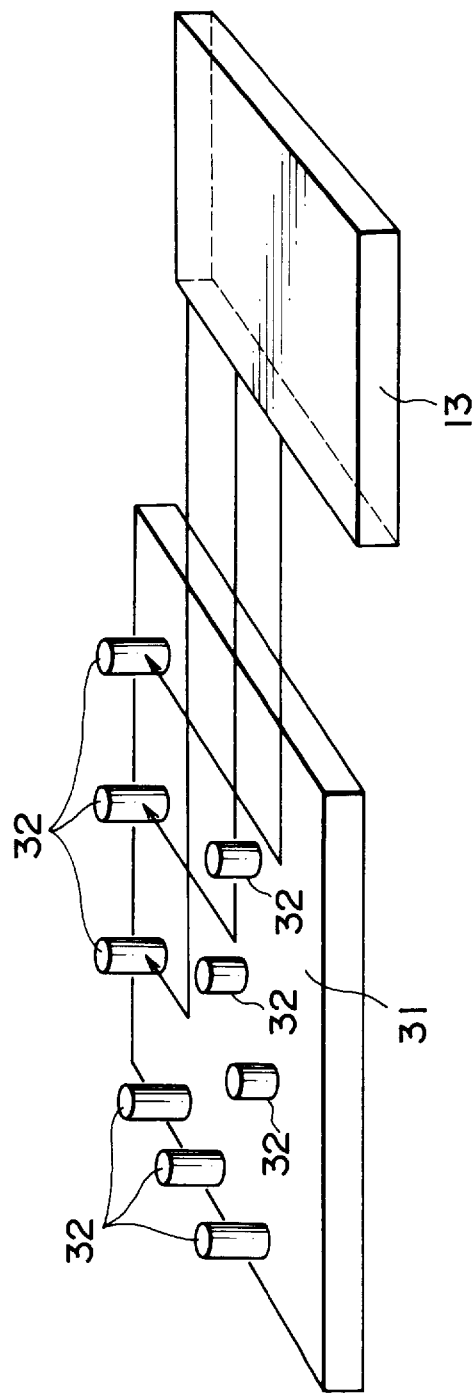
FIG. 11 is a perspective view showing the structure of another assembly table.

FIG. 11 shows another form of an assembly table as a reference table, which form is effective in the case where a component to be assembled has an abutment face of a large area, such as plate or block.

In this case, as shown in FIG. 11, it is preferable that at least three protrusions 32 be formed for each reference plane and that the upper surface of a space including the upper ends of those protrusions be used as a reference plane. This is because in temporary welding an increase in area of an abutment face 31 leads to easy deterioration of the abutment accuracy due to adhesion of spatter yielded in welding or worn pieces of the component to the abutment face.

Although in the above embodiment the servo float function is exercised for all the six robot axes, the mechanical float function may also be exercised for some of the six axes.

The mechanical float function is provided halfway of the robot hand or between the hand and the arm as an error absorbing unit having reproducibility. According to a mechanism using the mechanical float function, a plurality of steel balls are arranged interiorly and vertically between a body and a movable member, with the movable member being normally in a free state. When an air pressure is applied from the movable body side, a piston disposed in the interior of the movable member operates and a reference position or inclination restricted by a plurality of positioning steel balls can be locked in parallel with the body.

Figure 12:
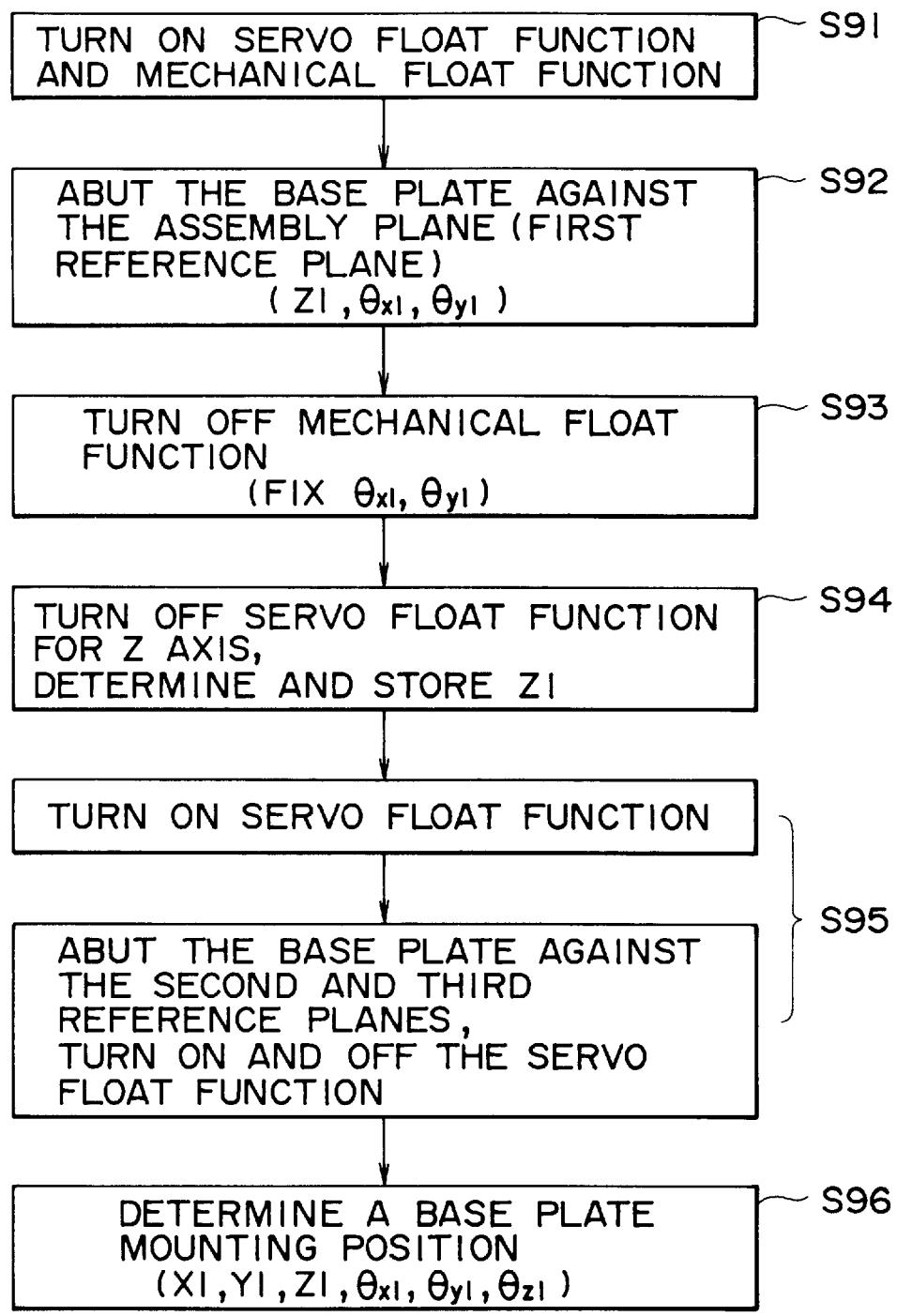
FIG. 12 is a flow chart showing procedure of assembling steps with a mechanical float being also used.

In connection with positioning of the base plate 11a, although the procedure using the servo float function has been described above in steps (1) to (5), a description will be given below about an example of positioning procedure which also uses the mechanical float function, with reference to the flow chart of FIG. 12.

In this example, the mechanical float function is exercised for two axes of freedom out of the six axes of freedom of the robot, and the servo float function is exercised for the remaining four axes of freedom.

The robot brings the lower surface of the base plate 11a into contact and abutment with the first reference plane 5 (② in FIG. 7, S92), whereby there can be obtained Z1 as Z coordinate, θx1 as an angle about X axis, and θy1 as an angle about Y axis, with respect to the base plate 11a (S92). At this stage the mechanical float function is canceled (S93), so that the mechanical float comes to retain the amounts of change in θx1 and θ0 y1 induced by the abutment relative to the taught posture. Thus, it becomes possible to perform the component mounting work without correcting the target values of freedom related to θx1 and θy1 out of the six axes of freedom of the robot.

If the servo float function is canceled with respect to the robot axis corresponding to the motion in the Z direction, it is possible to fix Z coordinate to the position of Z1 (S94). The Z1 is determined and stored as Z coordinate of the position where the base plate 11a is to be mounted (S94).

Next, as explained above in steps (3) and (4), the base plate 11a is brought into abutment with the second reference plane 6 and then with the third reference plane 7 (arrows ③ and ④ in FIG. 7). During this abutment, the servo float function is exercised. In the case of fixing a rotational angle about Z axis, X coordinate and Y coordinate, the servo float function is canceled (S95).

By performing the above procedure and by combination of both servo float function and mechanical float function, the base plate 11a can be mounted in a predetermined position on the first reference plane (S96). In this example, as mentioned above, the mechanical float function is exercised for two axes of freedom out of the six axes of freedom of the robot, and thus the six axes of freedom of the robot can partially be substituted by the mechanical float function.

B. When priority is given to a relative position between components

Figure 13A:
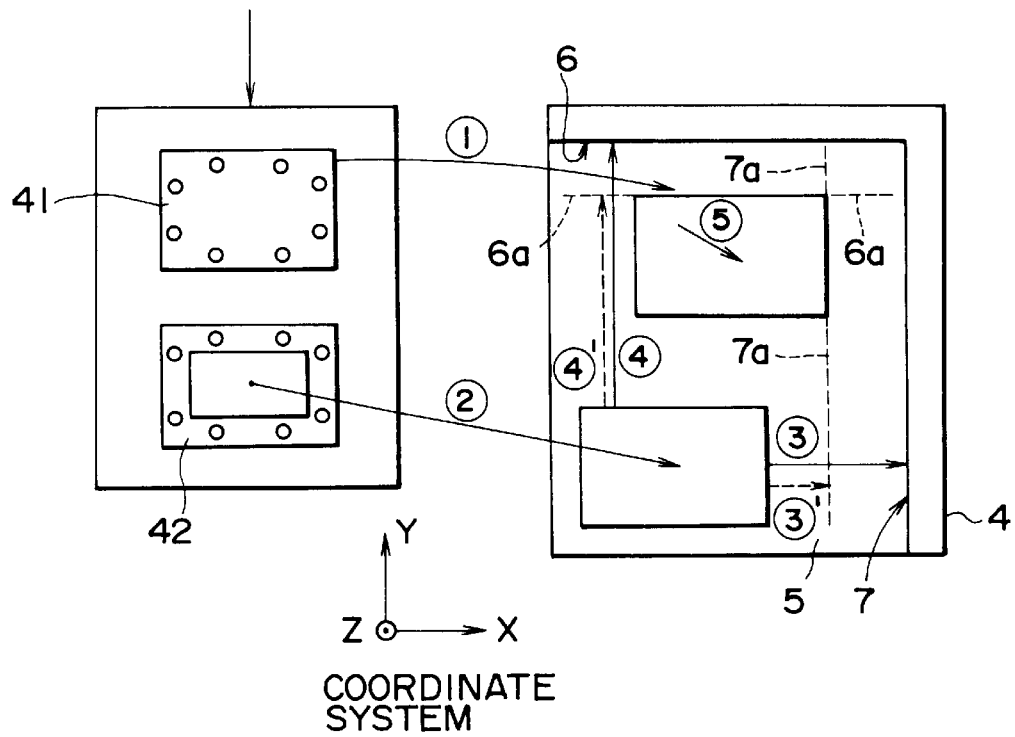
FIG. 13 is an assembling process diagram, with priority being given to a relative position between components.
Figure 13B:
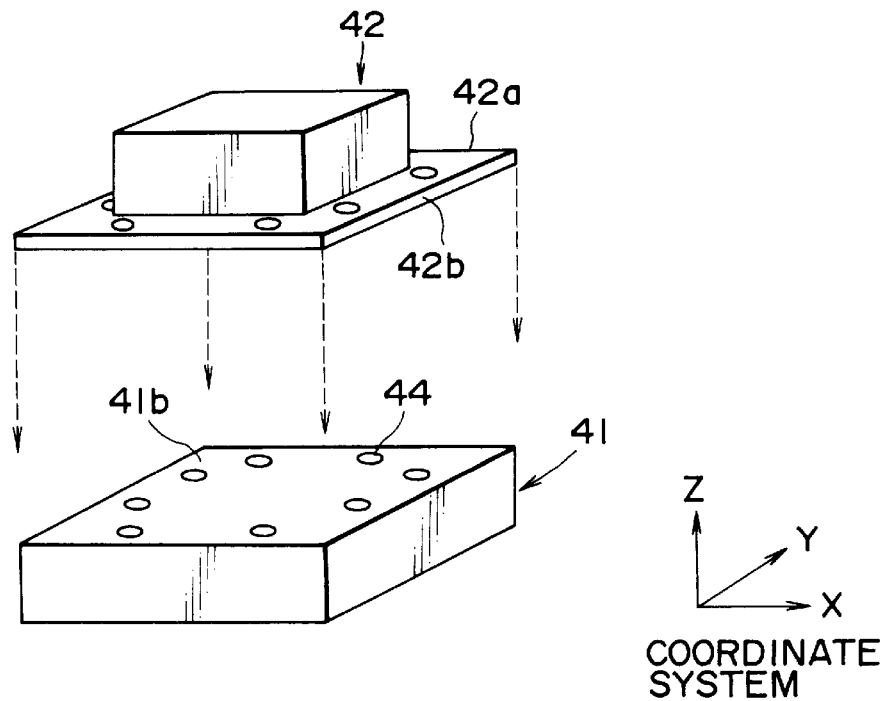
Figure 14:
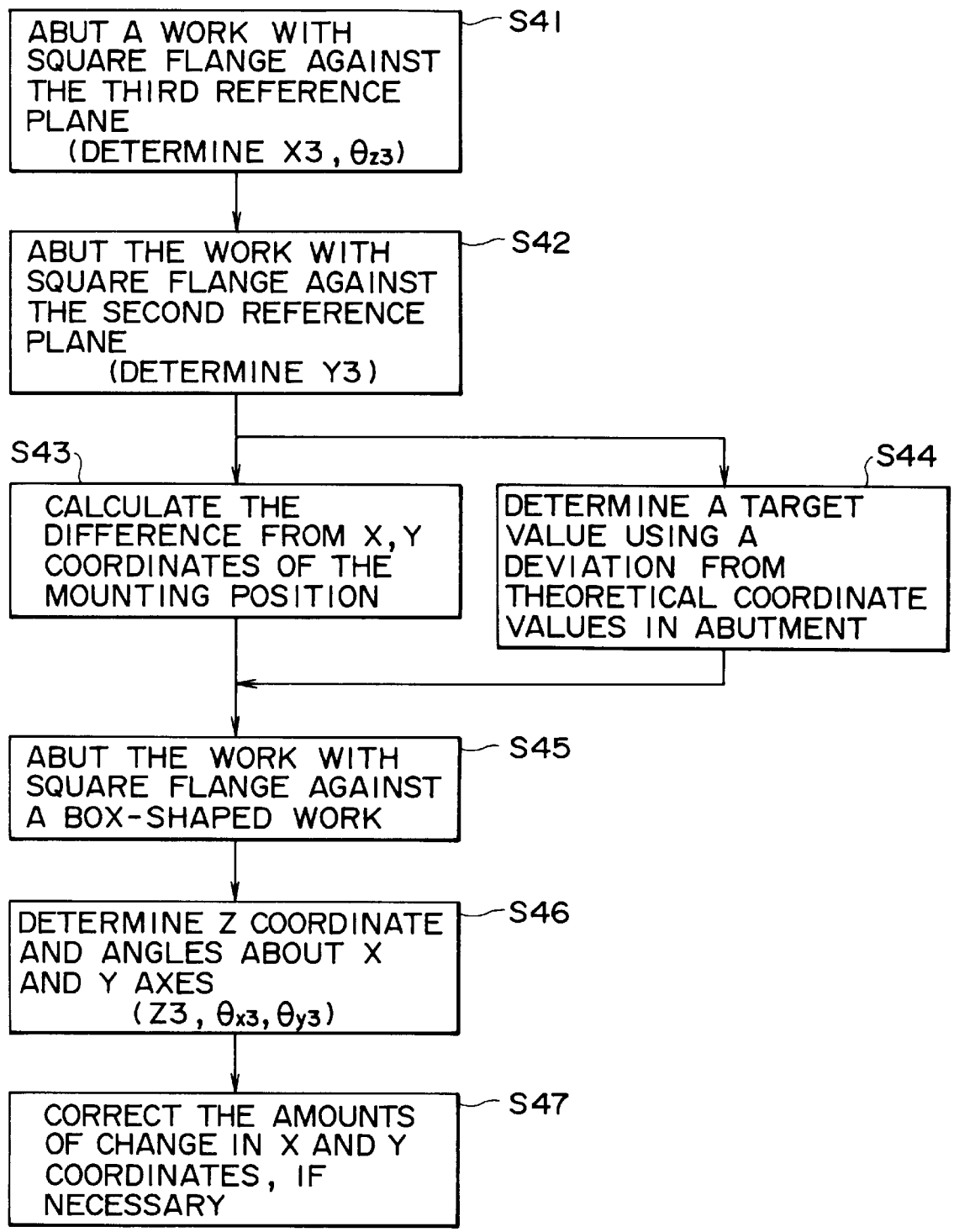
FIG. 14 is a flow chart showing procedure of the assembling steps in FIG. 13.

With reference to the assembling process diagram of FIG. 13 and the flow chart of FIG. 14, description is now directed to the case where a component 42 with a square flange having bolt holes 43 is to be positioned relative to a box-shaped component 41. The components to be assembled are as shown in FIG. 13(b). The component, or work, 42 with a square flange is put on the upper surface of the box-shaped component, or work, 41 and bolts are threaded into internal threads 44 through the bolt holes 43.

The box-shaped work 41 onto which is positioned the work 42 with a square flange, is arranged onto the first reference plane 5 as indicated at ①. This arrangement ① is performed in the same procedure as that of the abutment and mounting of the base plate 11a in the foregoing A.

As shown in FIG. 13(b), the posture of the work 42 with a square flange is assumed to be retained in such manner that a side 42a thereof and a side 42b thereof are in parallel with X and Y axes, respectively.

The robot grasps the work 42 with a square flange vertically relative to the assembly table 4 and is opposed exactly to the assembly table.

The side 42b of the work 42 with a square flange, which side is parallel to the Y axis, is brought into abutment with the third reference plane 7 (arrows ② and ③ in FIG. 13, S41), whereby there are determined X3 as X coordinate and $\theta z3$ as an angle about Z axis. Next, the side 42a parallel to the X axis of the work 42 with a square flange is brought into abutment with the second reference plane 6 (arrow ④ in FIG. 13, S42), whereby Y3 is determined as Y coordinate. In the case where the box-shaped work 41 is fixed with a chuck or the like, the work 42 may be abutted with a vertical plane 7a parallel to the third reference plane 7 of the work 41 and with a vertical plane 6a parallel to the second reference plane 6 of the work 41 (③', ④').

Then, the robot lifts the work 42 with a square flange, calculates the difference between the aforesaid X and Y coordinates and X, Y coordinates of the mounting position, taking information on the size of the box-shaped work into account (S43), then shifts the said difference little by little, and approaches the mounting position on the box-shaped work 41. Alternatively, X, Y coordinates, and an angle about Z axis, in abutment are theoretically determined in advance, and deviations therefrom are obtained. On the basis of the deviations, the data which have been taught as a work mounting position may be corrected to give a target value (S44). Next, as indicated with arrow ⑤ in FIG. 13, the robot brings the work 42 with a square flange into abutment with a face 41b of the box-shaped work 41 (S45) while maintaining the X, Y coordinates and the angle about Z axis, whereby there are determined Z3 as Z coordinate, as well as $\theta x3$ and $\theta y3$ as angles about X and Y axes (S46). At this time, there occurs a slight change in both X and Y coordinates due to angular changes about X and Y axes. If the angular changes are very small, it is not necessary to make correction, but if they exceed preset values, calculation is made on the basis of the angular changes to obtain the amounts of change in X and Y coordinates, and the amounts of change are corrected while restraining the other four axes of freedom than X and Y coordinates (S47), to complete mount mg of the works.

C. General procedure for correcting a pre-taught position, etc.

Figure 17:
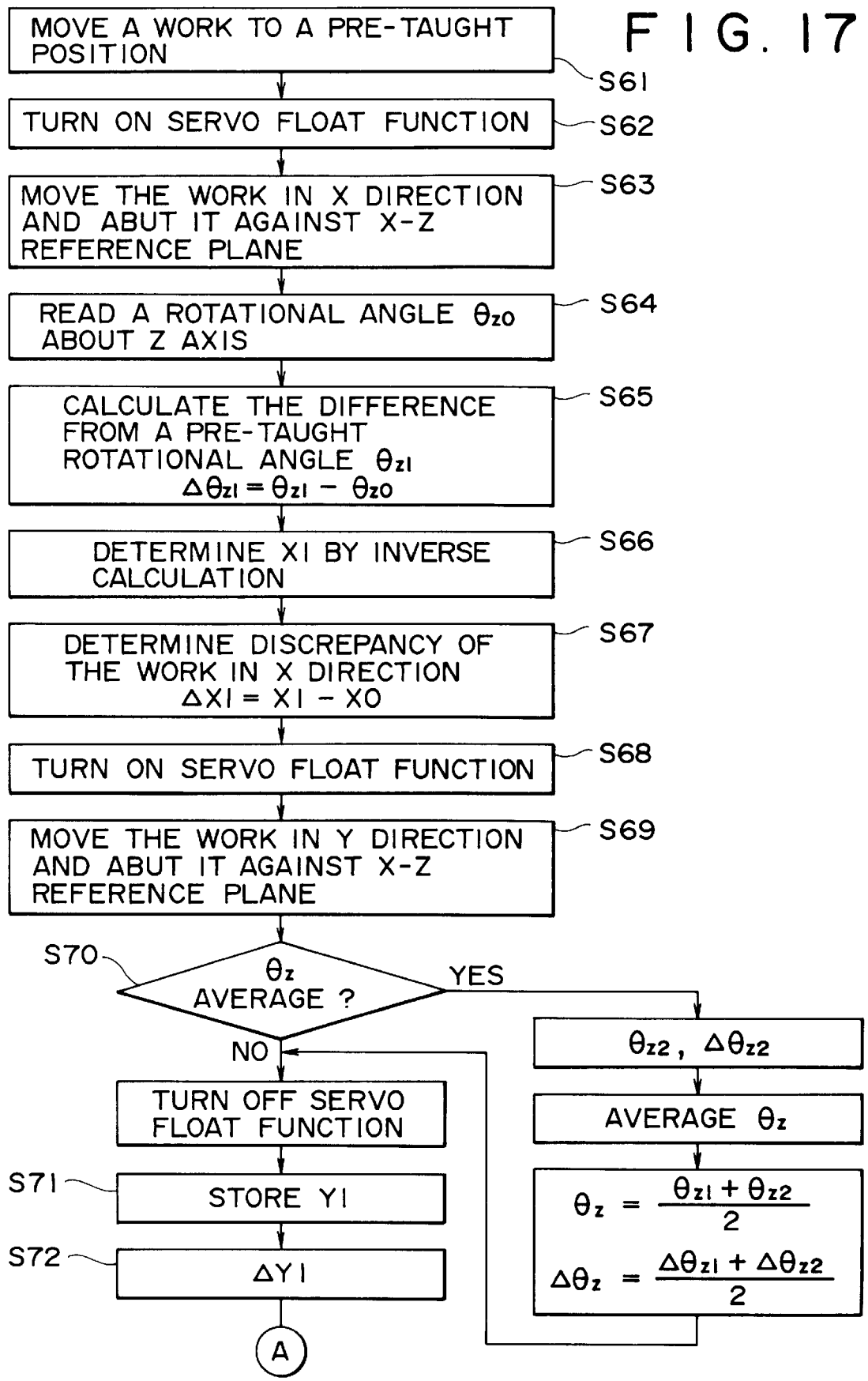
FIG. 17 is a first flow chart showing procedure for correcting a pre-taught position.
Figure 18:
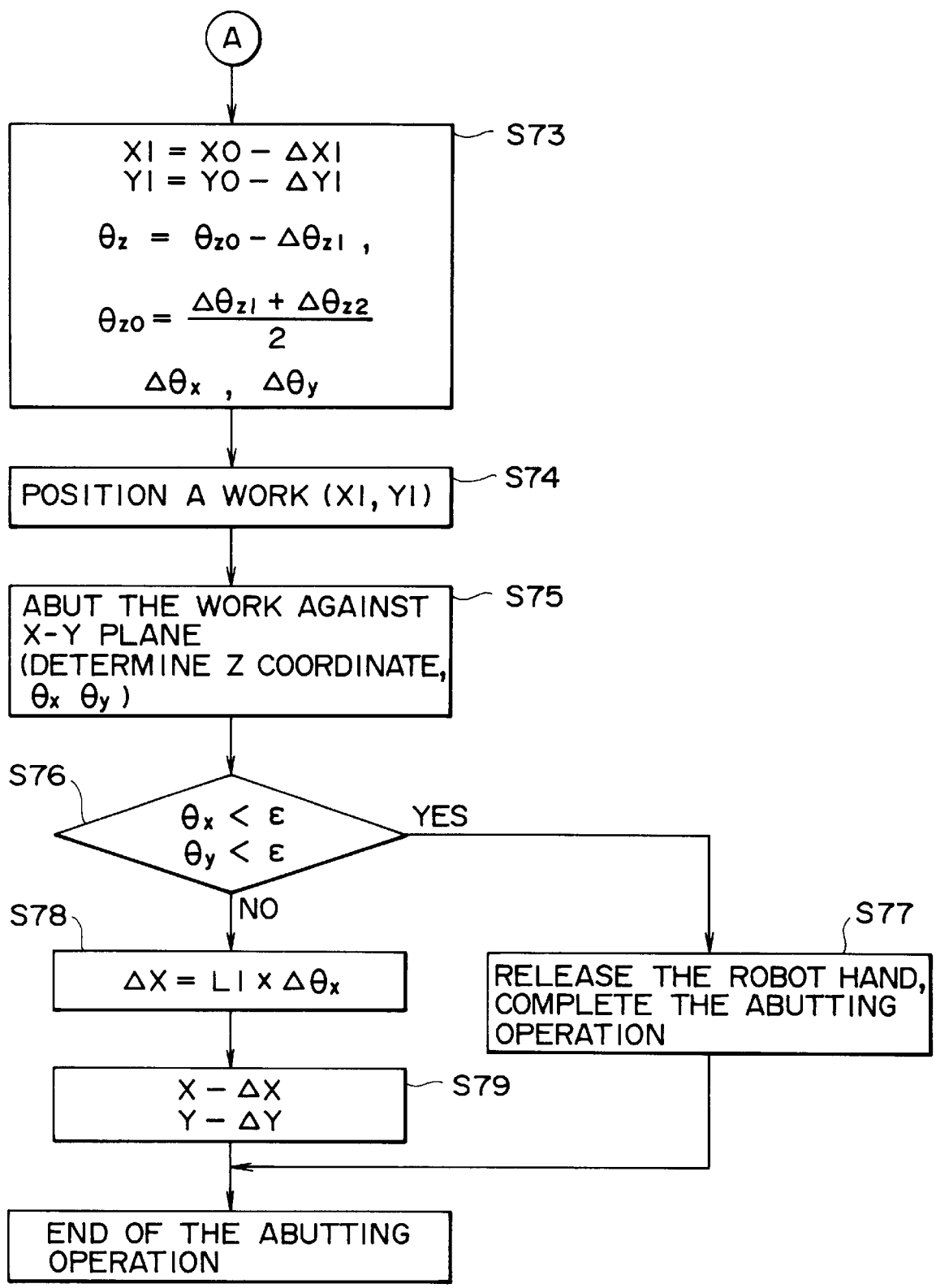
FIG. 18 is a second flow chart showing procedure for correcting a pre-taught position.

An example of a general procedure for correcting a pre-taught position, etc. will be described below with reference to abutment diagrams of FIGS. 15 and 16 and flow charts of FIGS. 17 and 18.

Figure 15:
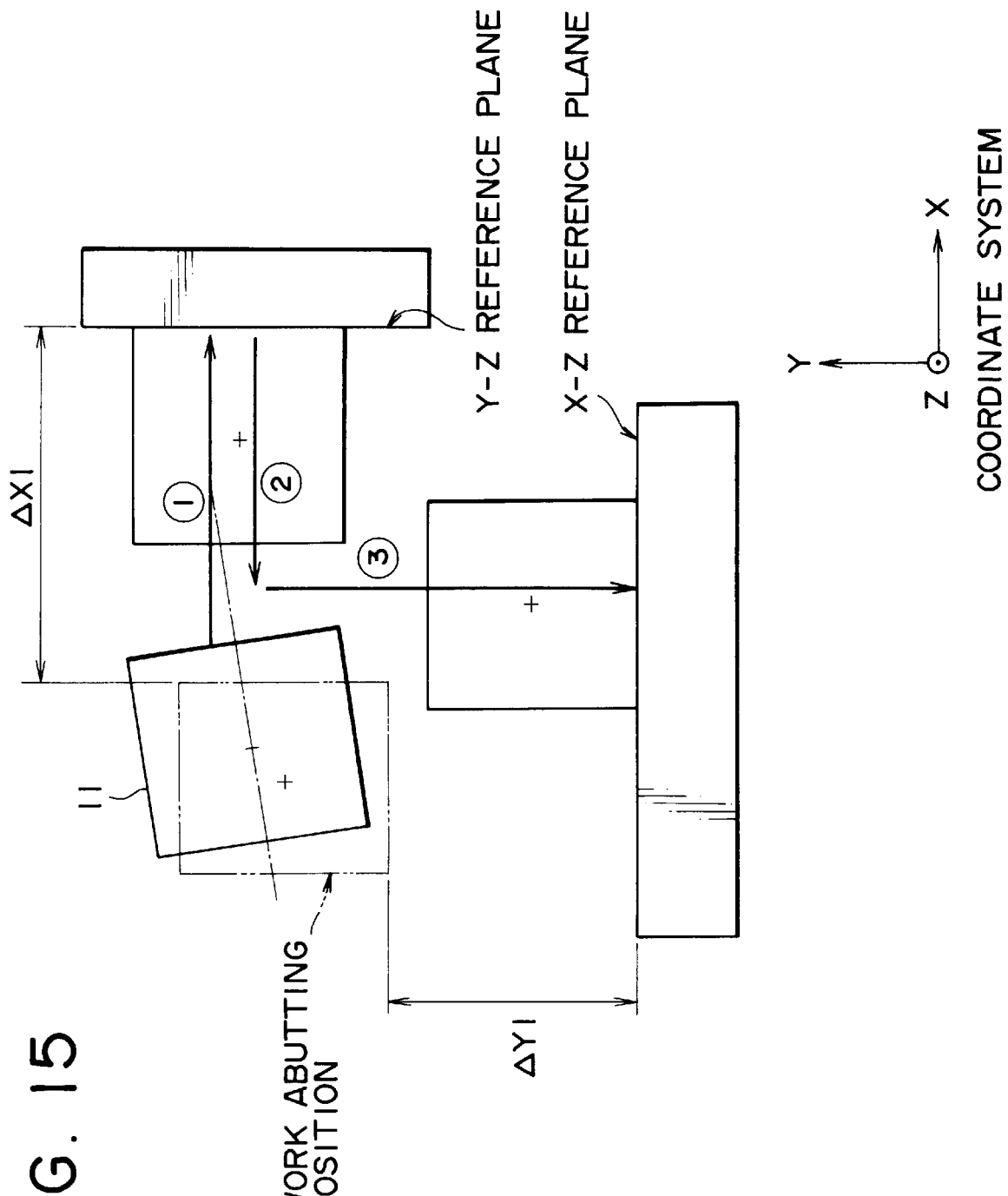
FIG. 15 is a first abutment diagram showing procedure for correcting a pre-taught position.

The robot moves a work 11 to a position which is pre-taught as a work mounting position, as shown in FIG. 15 (S61). This position deviates from the original position and posture for abutment due to an error in the work machining accuracy as well as a work feed error and a work grasping error. From this position, while the servo float function is exercised (S62), the robot moves in X direction and brings the work into abutment with a Y-Z reference plane, as indicated with arrow ① in FIG. 15 (S63).

This abutment causes the right end face of the actual work to lie along the Y-Z reference plane, so that there occurs rotation about Z axis. At this time, a wrist-end rotation angle $\theta z0$ about Z axis is read (S64), and there is calculated a difference from a pre-taught wrist-end rotation angle $\theta z1$, to obtain a discrepancy $\Delta\theta z1$ in the rotation angle about Z axis of the actual work (S65). Besides, X1, which is an X coordinate value at the hand center, can be determined by inverse calculation from the information on each robot axis at completed abutment (S66). Further, by calculating a difference thereof from X0 which is a pre-taught X coordinate value at the hand center there is obtained a discrepancy $\Delta X1$ in X direction of the work (S67).

Next, while the servo float function is exercised (S68), the robot moves in the Y direction as indicated with arrows ② and ③ in FIG. 15 and brings the work into abutment with a Y-Z reference plane (S69). Y1, which is a Y coordinate value in this abutment, is stored (S71). A difference thereof from a pre-taught Y coordinate value Y0 is obtained as a correction value $\Delta Y1$ (S72).

As to the rotation angle $\theta z$ about Z axis, the foregoing $\theta z1$ may be used, but it is also possible to store a rotation angle $\theta z2$ obtained, while allowing the servo float function to be exercised, then determines a difference $\Delta\theta z2$ from a pre-taught rotation angle, and calculate a mean value between it and $\Delta\theta z1$ obtained previously (the procedure after S70, YES is selected).

In accordance with the above procedure the following coordinate values, etc. are determined as work mounting positions, etc.: (S73)

X coordinate of the work mounting position  $X1 = X0 - \Delta X1$

Y coordinate of the work mounting position  $Y1 = Y0 - \Delta Y1$

Rotational angle about Z axis  $\theta z = \theta z0 - \Delta\theta z1$ or, $$\theta z0 - (\Delta\theta z1 + \Delta\theta z2)/2$$

where X0, Y0 and $\theta z0$ stand for X coordinate value, Y coordinate value, and rotational angle about Z axis, respectively, of the pre-taught work mounting position.

Figure 16:
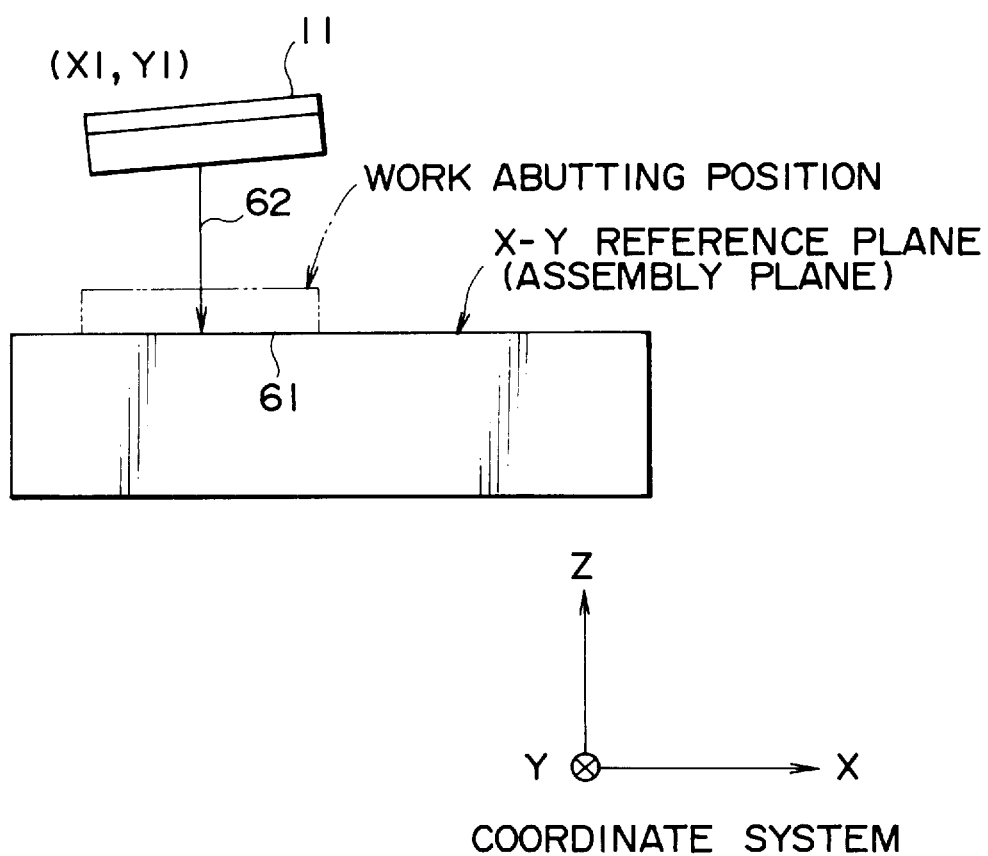
FIG. 16 is a second abutment diagram showing procedure for correcting a pre-taught position.

The rotational angle about Z axis is determined as the above $\theta z$, and the work is positioned at the above X1 and Y1 as shown in FIG. 16 (S74). At this time, the work 11 is positioned above an abutment position 61 on the X-Y reference plane, but has errors $\Delta\theta x$ and $\Delta\theta y$ for the angles about X and Y axes (S73).

As indicated with arrow 62 in FIG. 16, Z coordinate is determined naturally by abutment of the work with the X-Y reference plane (S75). The rotational angles $\theta x$ and $\theta y$ about X and Y axes, respectively, are also determined naturally.

At this time, if $\theta x$ and $\theta y$ are smaller than an allowable angle $\epsilon$ (the procedure after S76, YES is selected), the abutment work can be completed by releasing the robot hand (S77).

On the other hand, if $\theta x$ and $\theta y$ are larger than the allowable angle $\epsilon$, this means deviation from X1 and Y1 obtained previously as work mounting target values (the procedure after S76, NO is selected), so it is necessary to correct both X and Y coordinates. This correction is performed in the following manner.

Given that a linear distance between the point of intersection and the abutment face center is L1 and the rotational angle about X axis is $\Delta\theta x$, the said point of intersection being between the rotational axis at the wrist base end of the robot which exerts the greatest influence on $\theta x$ and the abutment face center, a displacement of X coordinate is given as $\Delta X = L1 \times \Delta\theta x$ (S78) and therefore a return by $\Delta X$ permits the work to be positioned at X1 (S79).

Also as to the Y coordinate, it can be corrected by the same processing as that performed for the X coordinate (S78, S79).

Although in this example it is assumed that each corner of the work is right-angled, in the case where the rotational angle θz about Z axis is to be obtained for a work whose corners are not right-angled, a face of the work whose inclination is an important factor may be first abutted with a reference plane and the angle obtained may be made θz. It is also possible to calculate Δθz geometrically from both data on the angle of the face to be abutted and data on the angle of a corner of the work.

Further, in the case of a work whose corner is not right-angled, and when the work is placed in parallel with the reference plane of the first abutment, the angle obtained in this abutment may be used as above.

If such a work is not parallel with two reference planes, θz is obtained in accordance with the following equation, in which the angle of a work side abutted with the first abutment face relative to the angle to the said abutment face obtained in mounting the work is assumed to be δ1, and the angle of a work side abutted with the second abutment face, which is obtained in mounting the work, is assumed to be δ2.

Rotational angle about Z axis:

$$\theta z = \delta z 0 - (\Delta\theta z 1 + \Delta\theta z 2 - \delta 1 - \delta 2)/2$$

D. Detection of completed abutment

Figure 19:
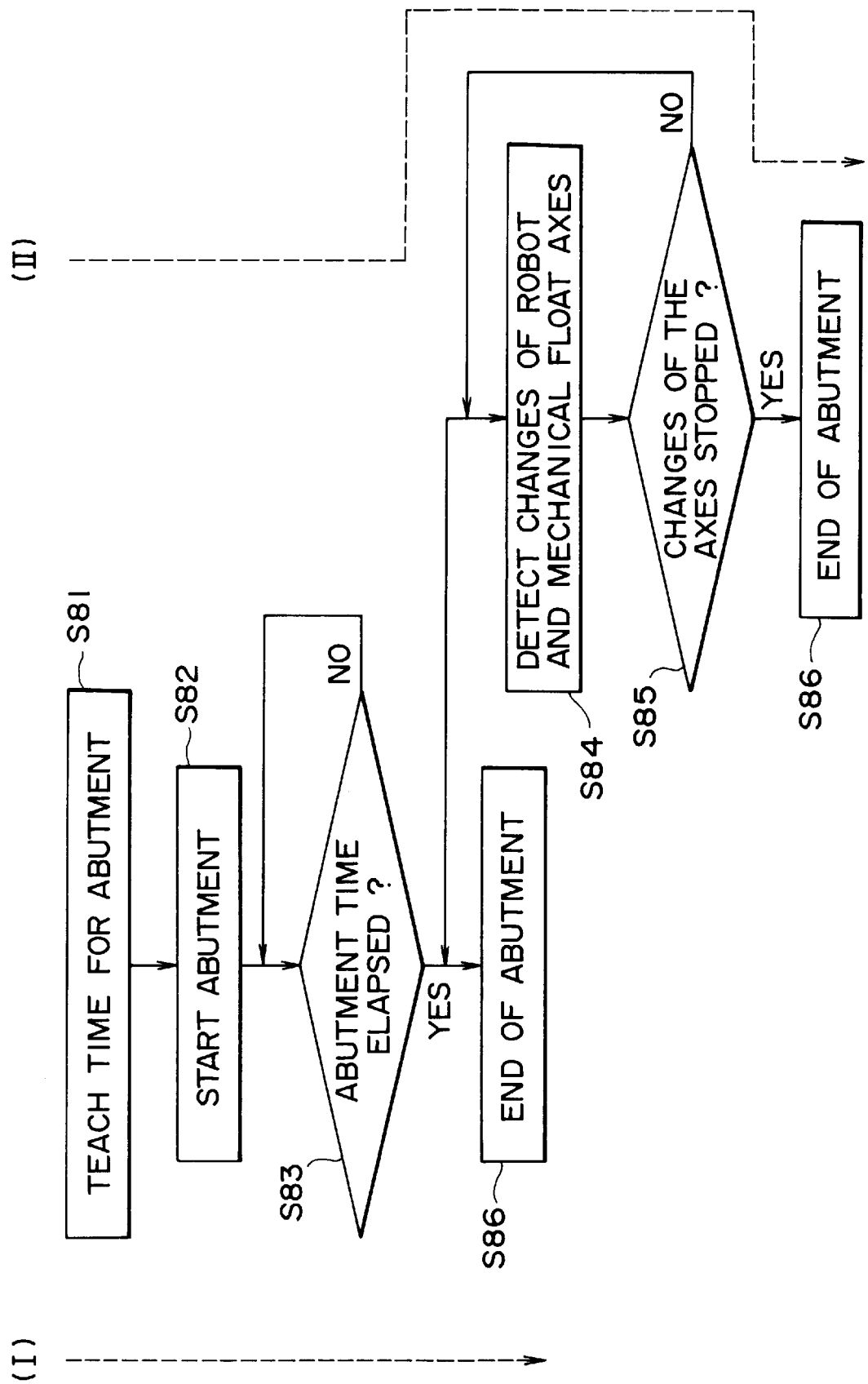
FIG. 19 is a flow chart showing judgment of a completed abutment with a reference plane.

Detection of completed abutment can be done by such two methods (I) and (II) as shown in FIG. 19.

(I) The time required for abutment is taught in advance (S81), then after the start of abutment (S82), when the lapse of the pre-taught time is confirmed (S83, YES), it is judged that the abutment is over (S86).

(II) In addition to the teaching of time in the above (I) (S81), changes of the robot and mechanical float axes are detected (S84), and when the stop of change is detected with respect to all the six axes (S85, YES), it is judged that the abutment is over (S86). Other than detecting the stop of change of the robot and mechanical float axes, the stop of change in motor torque and the stop of change in the output of a power sensor are also employable as judgment criteria. It is also possible to make these judgments of stop after the lapse of the aforesaid time.

Figure 20A:
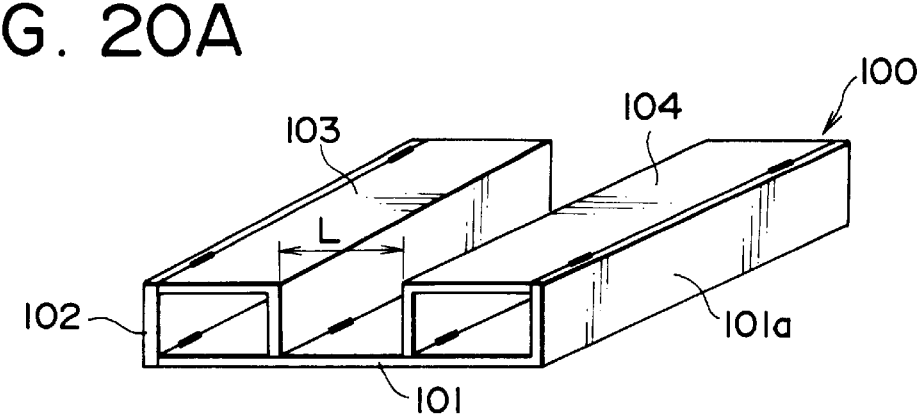
FIG. 20 is a diagram showing an example of procedure for assembling canning components.

Although the description of the above embodiment has been directed to the assembly of machined works, the above embodiment is also effective in the assembly of works for canning. The following description is now provided about the procedure for assembling works for canning into a product, which is shown in FIG. 20. FIG. 20(a) is a perspective view of an assembled can product, FIG. 20(b) illustrates an intermediate assembled product using an assembly table, and FIG. 20(c) illustrates a further work assembling step for the intermediate assembled product.

In FIG. 20(a), the assembled can product 100 is a temporarily welded product of four works which are a bottom plate 101 having one vertical side 101a out of four sides thereof, a strip 102, a first angle 103, and a second angle 104. First, the bottom side of the bottom plate 101 is brought into abutment with the strip 102 which is erected on the side of the bottom plate opposed to the vertical side 101a, and is welded thereto temporarily. Then, the first angle 103 is brought into abutment with the bottom plate 101 and the strip 102 so as to cover the space between the upper surface of the bottom plate and the strip 102, and is welded thereto temporarily. Further, the second angle 104 is brought into abutment with the bottom side of the bottom plate 101 and the vertical side 101a thereof so as to cover the space between the upper surface of the bottom plate and the vertical side thereof, and is welded thereto temporarily. In this way there is obtained the assembled can product 100 shown in FIG. 20(a). In this case, the spacing L between the first angle 103 and the second angle 104 is important.

Figure 20B:
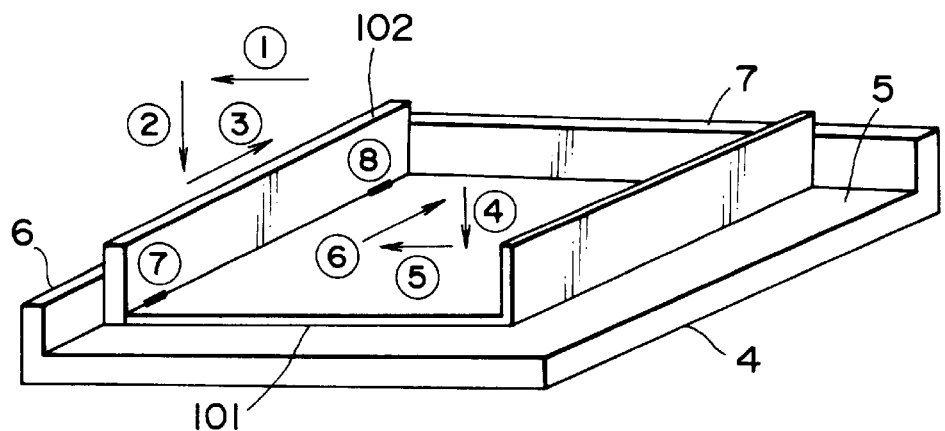
Figure 20C:
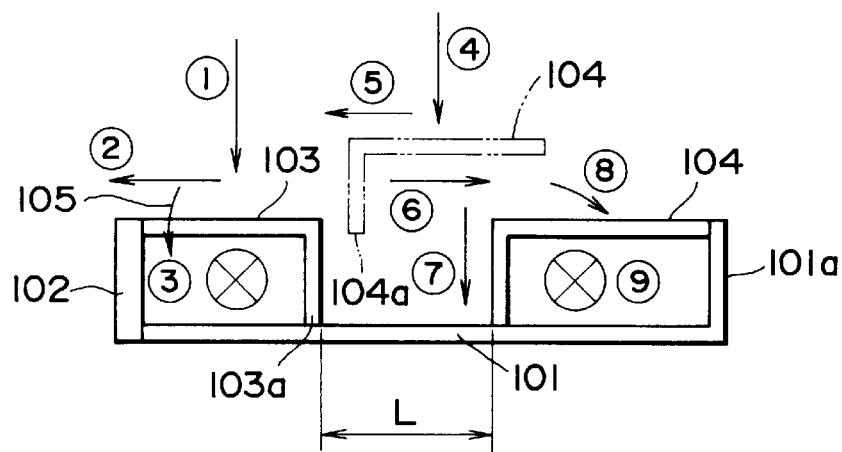

First, in FIG. 20(b), the strip 102 and the bottom plate 101 are placed under positioning onto an assembly table 4 which functions as a reference table. Like the assembly table illustrated in FIG. 1, the assembly table 4 has an upper surface which is formed as an assembly plane, or a first reference plane 5, further, a second reference plane 6 perpendicular to the first reference plane 5, and a third reference plane 7 perpendicular to both first and second reference planes 5, 6.

As indicated with arrow ① in FIG. 20(b), a widest face of the strip 102 is pushed against the second reference plane 6, and in this abutted state, the underside of the strip 102 is pushed against the first reference plane 5 of the assembly table 4, as indicated with arrow ②. Then, in this abutted state against the second and first reference planes 6, 5, an end face of the strip 102 is pushed against the third reference plane 7, as indicated with arrow ③. As a result, the strip 102 is positioned with respect to all of X, Y, Z, θx, θy, and θz, by the six-axis servo float function, as noted previously. If the positioning of the strip 102 in the direction of an end face thereof (toward the third reference plane 7) is not important and an error of several millimeters is allowable, the abutment of the strip against the third reference plane 7 may be omitted.

A further description will now be given about in what procedure the robot positions the bottom plate 101 relative to the strip 102. The posture of the strip 102 which has been positioned in the above manner by the robot is fixed by the use of a clamp. As the clamp there is used a mechanical or electric clamp. As indicated with arrow ④, the bottom plate 101 grasped by the robot is pushed at its widest face against the assembly plane (first reference plane) 5. In this abutted state against the assembly plane 5, the side of the bottom plate 101 opposed to the vertical side 101a is pushed against the strip 102, as indicated with arrow ⑤. In this case, the abutted side face of the strip 102 functions as a second reference plane. Further, while this abutted state against both assembly plane 5 and the side face of the strip 102 is retained, the bottom plate 101 is pushed against the third reference plane 7, as indicated with arrow ⑥. As a result, the bottom plate 101 is positioned with respect to all of X, Y, Z, θx, θy, and θz, by the six-axis servo float function, as noted previously. Then, the strip 102 fixed with a damp as above is subjected to positioning, and in the grasped and positioned state of the bottom plate 101 by the robot, a welding robot welds the bottom plate 101 and the strip 102 temporarily to afford an intermediate assembled product.

With reference to FIG. 20(c), a description will now be given of a step of temporarily welding the first and second angles 103, 103 to the intermediate assembled product to obtain a final assembled product. In FIG. 20(c) there is illustrated only the intermediate assembled product comprising the bottom plate 101 and the strip 102 both positioned on the assembly table, with the assembly table being not shown.

The robot grasps the first angle 103 and pushes it against the bottom plate 101 in such a manner that an end 103a of the first angle 103 comes into abutment against the upper surface of the bottom plate 101. At this time, θy in the six-axis servo float function is rendered inoperative to prevent the first angle 103 from rotating in the direction of arrow 105. While the first angle 103 remains pressed in the direction of arrow ①, the first angle 103 is moved in the direction of arrow ② and is pushed against a side face of the strip 102. Further, while the abutment of the first angle 103 in the directions of arrows ① and ② is maintained, the first angle 103 is moved in the direction of arrow ③, that is, toward the back side in the paper thickness direction, thereby causing the first angle 103 to press against the third reference plane 7, whereby out of the six axes of the first angle 103, five axes (X, Y, Z, $\theta_x$, $\theta_z$) except $\theta_y$ are positioned. Then, the welding robot welds the first angle 103 to the bottom plate 101 and the strip 102 temporarily.

Next, the robot grasps the second angle 104 and moves in the direction of arrow ④ until the second angle reaches its position indicated with a dash-double dot line. Then, as indicated with arrow ⑤, a side face 104a of the second angle 104 is pushed against the side face 103a of the first angle 103 and is positioned At this time, an error is absorbed by the servo float function and the posture after absorption of the error is retained by making the servo float function of a specific axis inoperative. Alternatively, a difference from taught information is calculated by a posture information read means provided in each axis and the posture of the second angle 104 relative to the first angle 103 is corrected on the basis of the difference thus calculated. Then, as indicated with arrow ⑥, the second angle 104 is moved horizontally in accordance with calculated data so as to ensure the spacing L between the first angle 103 and the second angle 104.

Next, as indicated with arrow ⑦, the second angle 104 is pushed against the bottom plate 101 so that the lower end 104a thereof comes into abutment with the upper surface of the bottom plate. In this case, since priority is given to the spacing L between the first angle 103 and the second angle 104, there may occur a case where welding is infeasible due to the formation of a clearance between the other end of the second angle 104 and the vertical side 101a of the bottom plate 101. In view of this point, the second angle 104 is rotated like arrow ⑧ so that the other end of the second angle 104 comes into abutment with the vertical side 101a. While the second angle 104 is pressed in the directions of arrows ⑦ and ⑧, the second angle is moved in the direction of arrow ⑨, that is, toward the back side in the paper thickness direction until abutment with the third reference plane 7. Consequently, out of the six axes of the second angle 104, five axes (X, Y, Z, $\theta_x$, $\theta_z$) except $\theta_y$ are positioned. Then, the welding robot welds the second angle 104 to both upper surface and vertical side 101a of the bottom plate 101 temporarily.

Thus, by using necessary portions of assembled works as reference planes, it is possible to assemble a large number of works by the robot while ensuring the required accuracy. Further, by turning on and off necessary portions of the six-axis servo float function or by making portions of the six-axis servo float function different in strength, it is possible to prevent a positional change relative to the first reference plane at the time of transfer from abutment with the first reference plane to abutment with the second reference plane. Such a flexible measure can be attained by the servo float function which can make adjustment by changing control gains for the six axes or by changing the method of setting a torque limiter.

As set forth above, the invention defined in claim 1 involves the first step of pressing a work against the first reference plane to change the posture thereof and the second step of pressing the work against the second reference plane to change the posture thereof. Through these steps, portions of the work requiring accuracy in its posture can be corrected, and thus it is possible to assemble works without using any positioning device for the correction of a work supply error or a work grasping error.

The invention defined in claim 2, in addition to the effect attained by the invention of claim 1, exhibits the effect that works can be assembled one after another by using a work positioned on the assembly table as a reference.

The invention defined in claim 3, in addition to the effect attained by the invention of claim 1, exhibits the effect that by the use of a robot having servo float means capable of turning on and off it becomes possible softwarewise to press a work against a reference plane and thereby change the posture thereof thus facilitating storage of a postural change and fixing of the posture after change.

The invention defined in claim 4, in addition to the effect attained by the invention of claim 1, exhibits the effect that each work can be assembled with a high accuracy because its faces are pressed against reference planes in order according to the degree of importance thereof.

The invention defined in claim 5 uses a robot having servo float means, which robot brings each work into abutment with the first, second and third reference planes successively in this order, whereby it becomes clear in what manner correction is to be made for attaining a correct posture of the component with respect to the six axes (X, Y, Z, $\theta_x$, $\theta_y$, $\theta_z$). Consequently, it is possible to move the work up to a predetermined position at its correct posture after the correction. Since there is no fear that there may occur a clearance at the time of clamping with bolts between components, complicated works such as machined works can be assembled accurately.

According to the invention defined in claim 6, using a robot having servo float means, each work is brought into abutment with the first, second and third reference planes successively in this order, whereby postures of the work are fixed according to which posture has become correct earlier than the others with respect to the six axes (X, Y, Z, $\theta_x$, $\theta_y$, $\theta_z$). Therefore, it is possible to position the work at a correct posture while assembling it and hence possible to minimize the clearance between works and ensure a high weld quality. Thus, automatic assembly of works for canning, which has heretofore been considered infeasible, can now be effected The invention defined in clam 7, in addition to the effect attained by the invention of claim 6, brings about the effect that assembly of works can be done softwarewise by turning six-axis servo float means successively from on to off The invention defined in claim 8, in addition to the effect attained by the invention of claim 6, brings about the effect that assembly of works can be done by a mechanical method involving a series of operations of pressing each work against the first, second and third reference planes successively in this order to correct the posture of the work.

The invention defined in claim 9, in addition to the effect attained by the invention of claim 6, brings about the effect that, for example in the case of pushing an end of an L-shaped work against a reference plane, its posture is restricted so as not to cause rotation of the work, and while maintaining a predetermined posture of L shape, the posture of the other portion is corrected, thus making a selective correction possible.

What is claimed is:

1. A component assembling method using:
   a reference table having at least two planes which are first and second reference planes of different in the direction of normal line from each other; and
   a robot system for grasping and moving a component to a given position on said reference table, said method including at least:

a first step of pushing the component as grasped by said robot system against said first reference plane, changing the posture of the robot system to let the component lie along the first reference plane, and storing or fixing said change in posture of the robot system; and a second step, subsequent to said first step, of pushing the component as grasped by said robot system against said second reference plane, changing the posture of the robot system to let the component lie along the second reference plane, and storing or fixing said change in posture of the robot system, wherein the position of the component relative to said reference table is determined by correcting the posture of the component in accordance with the changes in posture stored in said first and second steps or by fixing the posture of the component in the first step and that in the second step successively.

2. A component assembling method according to claim 1, wherein, when two or more components are to be assembled, said reference table is used as an assembly table for positioning the first component thereon, and thereafter the component thus positioned on the reference table is used as the reference table for positioning the next component.

3. A component assembling method according to claim 1, wherein said robot system has six or more axes of freedom and has servo float means capable of turning on and off, said servo float means reducing the rigidity of robot motion by changing the control gain of each axis of the robot or by setting a torque limiter appropriately to follow the component to be assembled.

4. A component assembling method according to claim 1, wherein a first face for which is required the highest accuracy, out of the constituent faces of the component, is pushed against a reference plane as a first reference plane which is most parallel to said first face of the component, and a second face for which is required the second highest accuracy, out of the constituent faces of the component, is pushed against a reference plane as a second reference plane other than said first reference plane, said second reference plane being most parallel to said second face of the component.

5. A component assembling equipment comprising a reference table for positioning a component, a robot for grasping and moving the component, and a control unit for controlling said robot, with position information of the component on said reference table being given in advance to said control unit, said reference table having a first reference plane (X-Y plane), a second reference plane (X-Z plane) and a third reference plane (Y-Z plane), which are different in the direction of normal line from one another, said robot having six axes of freedom (X, Y, Z, $\theta_x$, $\theta_y$, $\theta_z$) or more and having means for reading posture information of the robot, and said control unit having servo float means which reduce the rigidity of robot motion by changing the control gain of each axis of the robot or by setting a torque limiter appropriately to follow the component to be assembled, means for calculating the difference between the posture information of the robot obtained by successive abutment of the component with said first, second and third reference planes and said position information given in advance, and correction means for correcting said position information in accordance with the difference calculated by said calculating means, wherein, before said robot positions the component on said reference table, said position information of the robot is corrected through abutment of the component with said first, second and third reference planes.

6. A component assembling equipment comprising a reference table for positioning a component, a robot for grasping and moving the component, and a control unit for controlling said robot, with position information being given in advance to said control unit, said reference table having a first reference plane (X-Y plane), a second reference plane (X-Z plane) and a third reference plane (Y-Z plane), which are different in the direction of normal line from one another, said robot having six axes of freedom (X, Y, Z, $\theta_x$, $\theta_y$, $\theta_z$) or more, said control unit having servo float means which reduce the rigidity of robot motion by changing the control gain of each axis of the robot or by setting a torque limiter appropriately to follow the component to be assembled, and means for successively fixing the postures of the robot obtained by successive abutment of the component with said first, second and third reference planes, wherein, when said robot positions the component on said reference table, the positioning is performed through successive abutment of the component with said first, second and third reference planes.

7. A component assembling equipment according to claim 6, wherein said fixing means fix the posture of each said robot axis by making said servo float means in each robot axis inoperative after the successive operations of the servo float means involving abutting the component successively with said first, second and third reference planes to follow the planes.

8. A component assembling equipment according to claim 6, wherein said fixing means cause the component to lie along at least one of said first, second and third reference planes and at the same time cause it to abut the other reference planes.

9. A component assembling equipment according to claim 6, further including means for making the servo float means in a specific robot axis inoperative in the case where the component to be assembled is of a shape which causes rotation of the component in excess of an error range upon abutment of the component with any of said reference planes.

* * * * *